United States Patent
Lee et al.

(10) Patent No.: US 9,319,786 B2
(45) Date of Patent: Apr. 19, 2016

(54) MICROPHONE MOUNTING STRUCTURE OF MOBILE TERMINAL AND USING METHOD THEREOF

(71) Applicant: LG ELECTRONICS INC., Seoul (KR)

(72) Inventors: Keansub Lee, Seoul (KR); Hosung Song, Seoul (KR); Yonghee Lee, Seoul (KR); Youngjoo Son, Seoul (KR); Joontae Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 298 days.

(21) Appl. No.: 13/925,450

(22) Filed: Jun. 24, 2013

(65) Prior Publication Data
US 2013/0343572 A1    Dec. 26, 2013

(30) Foreign Application Priority Data

Jun. 25, 2012 (KR) .................. 10-2012-0068209
Sep. 21, 2012 (KR) .................. 10-2012-0105419

(51) Int. Cl.
*H04R 3/00* (2006.01)
*H04M 1/03* (2006.01)
*H04R 1/40* (2006.01)

(52) U.S. Cl.
CPC .............. *H04R 3/005* (2013.01); *H04M 1/03* (2013.01); *H04R 1/406* (2013.01); *H04R 2410/05* (2013.01); *H04R 2499/11* (2013.01)

(58) Field of Classification Search
None
See application file for complete search history.

(56) References Cited

U.S. PATENT DOCUMENTS

| 6,717,991 | B1 | 4/2004 | Gustafsson et al. | |
|---|---|---|---|---|
| 9,055,371 | B2 * | 6/2015 | Tammi | H04R 1/406 |
| 2001/0041583 | A1 | 11/2001 | Housni | |
| 2008/0069389 | A1 * | 3/2008 | Zhang | H04R 1/406 |
| | | | | 381/355 |
| 2008/0091421 | A1 * | 4/2008 | Gustavsson | G10L 25/78 |
| | | | | 704/233 |
| 2008/0175408 | A1 * | 7/2008 | Mukund | G10L 21/0208 |
| | | | | 381/94.1 |
| 2008/0247584 | A1 * | 10/2008 | Zhang | H04M 1/035 |
| | | | | 381/357 |
| 2009/0054111 | A1 * | 2/2009 | Takizawa | H04M 1/0214 |
| | | | | 455/575.1 |
| 2009/0170563 | A1 | 7/2009 | Chen | |
| 2009/0196429 | A1 | 8/2009 | Ramakrishnan et al. | |
| 2011/0058676 | A1 * | 3/2011 | Visser | 381/17 |
| 2012/0029926 | A1 * | 2/2012 | Krishnan | G10L 19/038 |
| | | | | 704/500 |

FOREIGN PATENT DOCUMENTS

| JP | 2005-136569 A | 5/2005 |
|---|---|---|
| KR | 10-0865147 B1 | 10/2008 |
| WO | WO 2011/051810 A2 | 5/2011 |

* cited by examiner

*Primary Examiner* — Paul Huber
(74) *Attorney, Agent, or Firm* — Birch, Stewart, Kolasch & Birch, LLP

(57) ABSTRACT

Disclosed are a microphone mounting structure of a mobile terminal, capable of capturing a sound generated from a subject in an optimum manner while capturing an image and reproducing the captured image, and a using method thereof. In the present invention, a first microphone and a second microphone are arranged on one side surface of a terminal body, in a spaced manner from each other on different axes, so that they can be used in a sound capturing mode. Three or more microphones are arranged on a plurality of surfaces of the terminal body, at various intervals, by interworking with various situation changes. Then, the number of microphones to be used for capturing a sound, and a microphone combination are selected according to a user's behavior scenario. Under such configuration, an optimum audio zooming function can be implemented.

13 Claims, 30 Drawing Sheets

MICROPHONE MOUNTING STRUCTURE OF MOBILE TERMINAL AND USING METHOD THEREOF

CROSS-REFERENCE TO RELATED APPLICATION

Pursuant to 35 U.S.C. §119(a), this application claims the benefit of earlier filing date and right of priority to Korean Application Nos. 10-2012-0068209 and 10-2012-0105419, filed on Jun. 25, 2012 and Sep. 21, 2012, the contents of all of these applications are incorporated by reference herein in its entirety.

BACKGROUND OF THE DISCLOSURE

1. Field of the Disclosure

The present disclosure relates to a mobile terminal, and particularly, to a microphone mounting structure of a mobile terminal capable of capturing a sound generated from a subject in an optimum manner, while capturing an image and reproducing the captured image, and a using method thereof.

2. Background of the Disclosure

A mobile terminal may be configured to perform various functions. The examples of the various functions may include a data and voice communication function, a photo or video capture function through a camera, a voice storage function, a music file reproduction function through a speaker system, an image or video display function, and the like. Some mobile terminals may include an additional function capable of implementing games, and some other mobile terminal may be implemented as a multimedia player. Moreover, recent mobile terminals receive broadcast or multicast signals to allow the user to view video or television programs.

Various attempts have been made to implement enhanced functions of the mobile terminal not only by structural improvements, but also by hardware or software improvements. A touch function of the mobile terminal allows even a user having a difficulty in inputting buttons or keys to conveniently operate the mobile terminal, by using a touch screen. Recently, this touch function is considered as an important function of the mobile terminal, together with a User Interface (UI) as well as a simple input.

The mobile terminal provides various functions for capturing a subject using a camera. A user may enlarge an image with respect to a specific subject using control options of a camera, and may manually/automatically control a focal point of an image. The user may capture a desired image using a face recognition function. Also, the user may capture an image using a front camera or a rear camera of the mobile terminal according to a position of a subject. Especially, the user may capture an image by converting a capturing mode according to a type of a scene (e.g., landscape or figure).

In case of capturing a desired subject or scene using such various capturing techniques, a sound or a voice generated from the subject is captured by a microphone array to thus be stored in the mobile terminal. However, in the conventional art, there is a problem that not only a sound generated from a subject, but also a peripheral sound and noise are captured.

In order to capture a sound generated from a subject while capturing a moving image, required is selective directivity with respect to sound sources disposed on a horizontal axis or a vertical axis based on a user. In order to selectively capture a sound source generated from a specific direction through such selective directivity, microphones should be arranged on a body of the mobile terminal in an optimum manner.

In the conventional art, a plurality of microphone units (hereinafter, will be abbreviated as 'microphones') are arranged on a rear surface of the mobile terminal, so as to cross each other. Under such configuration, optimum directivity is implemented regardless of rotation of the mobile terminal. In the case of mounting a plurality of microphones in the mobile terminal, a large mounting space is required. Therefore, it is preferable to arrange a smaller number of microphones, e.g., two microphones. In this case, the two microphones are spaced from each other on a straight line in a horizontal or vertical direction, on a rear surface of the mobile terminal, so as to be used in a stereo mode.

In the case of using two microphones, the two microphones are spaced from each other on a straight line in a horizontal or vertical direction. In this case, the mobile terminal should be in a horizontal view state or a vertical view state in order to capture a sound. More specifically, in case of arranging two microphones on a straight line in a horizontal direction on a rear surface of the mobile terminal, if the mobile terminal is in a horizontal view state for capturing a sound, only sound sources distributed on a horizontal axis based on a user can be distinguished from each other. On the other hand, if the mobile terminal is in a vertical view state for capturing a sound, only sound sources distributed on a vertical axis can be distinguished from each other, whereas sound sources distributed on a horizontal axis cannot be distinguished from each other.

Further, in case of mounting three or more microphones to the mobile terminal, the microphones should be arranged at various positions at various intervals, by interworking with a change of various situations such as an application type, a setting of a specific application (sampling rate, general capturing mode, sound capturing mode, etc.) and a user's behavior. Also, the number of microphones used to capture a sound, and a microphone combination should be selected. However, research on such configuration is not actively ongoing.

SUMMARY OF THE DISCLOSURE

Therefore, an aspect of the detailed description is to provide a microphone mounting structure of a mobile terminal, capable of capturing a sound or a voice of a subject in an optimum manner, regardless of a rotation angle of the mobile terminal, when capturing an image and reproducing the captured image, and a using method thereof.

Another aspect of the detailed description is to provide a microphone mounting structure of a mobile terminal, capable of using only two microphones in order to minimize a mounting space of a mobile terminal, when capturing an image and reproducing the captured image, and a using method thereof.

Still another aspect of the detailed description is to provide a microphone mounting structure of a mobile terminal, capable of arranging three or more microphones on various positions at various intervals, by interworking with various situation changes, and capable of implementing an optimum audio zooming function by selecting the number of microphones used to capture a sound (microphone combination) according to each situation, and a using method thereof.

To achieve these and other advantages and in accordance with the purpose of this specification, as embodied and broadly described herein, there is provided a microphone mounting structure of a mobile terminal, comprising: a first microphone mounted to one side surface of a terminal body; and a second microphone arranged on a different axis from the first microphone, and spaced from the first microphone with the same distance in directions of a horizontal axis and a vertical axis.

Both of the first microphone and the second microphone may be arranged on a rear surface of the terminal body.

The same distance may be 1.45 cm based on a sampling rate of 22.05 KHz.

The first microphone and the second microphone may be arranged at a right side or a left side of a camera.

The first microphone and the second microphone may be arranged to have an angle of 45° therebetween.

The first microphone and the second microphone may be arranged on different surfaces of the terminal body.

According to a modification embodiment, the first microphone and the second microphone may be arranged to have different spacing distances in a horizontal direction and a vertical direction.

According to an embodiment, the first microphone may be arranged on a rear surface of the terminal body, and the second microphone may be arranged on an upper surface of the terminal body. The first microphone and the second microphone may be arranged to have an angle of 45° therebetween.

According to another embodiment, the first microphone may be arranged on an upper surface of the terminal body, and the second microphone may be arranged on a rear surface of the terminal body.

According to still another embodiment, the first microphone may be arranged on a rear surface of the terminal body, and the second microphone may be arranged on a front surface of the terminal body.

Once the second microphone is arranged on the front surface of the terminal body, a projected position of the second microphone may be at an angle of 45°, an upper right side based on the first microphone.

According to still another embodiment, the first microphone may be arranged on a front surface of the terminal body, and the second microphone may be arranged on a rear surface of the terminal body.

Once the first microphone is arranged on the front surface of the terminal body, the second microphone may be positioned on a vertical axis, at an angle of 45°, a lower right side based on a projected position of the first microphone.

According to still another embodiment, the first microphone may be arranged on a rear surface of the terminal body, and the second microphone may be arranged on a right side surface of the terminal body.

According to still another embodiment, the first microphone may be arranged on a left side surface of the terminal body, and the second microphone may be arranged on a rear surface of the terminal body.

According to still another embodiment, the first microphone may be arranged on a left side surface of the terminal body, and the second microphone may be arranged on an upper surface of the terminal body.

According to still another embodiment, the first microphone may be arranged on an upper surface of the terminal body, and the second microphone may be arranged on a right side surface of the terminal body.

To achieve these and other advantages and in accordance with the purpose of this specification, as embodied and broadly described herein, there is also provided a method for using microphones of a mobile terminal, the method comprising: arranging three or more microphones at various positions of a terminal body at various intervals, in a spaced manner from each other by a prescribed distance, by interworking with a change of various situations such as an application type, an application setting and a user's behavior; and selecting a microphone to be used for capturing a sound, by monitoring a state of the mobile terminal according to a type of an execution application and a user's behavior scenario.

In case of mounting three or more microphones, a camera may be arranged on the center of a plane which connects the microphones with each other.

The application type may comprise a video call, a voice recording, a voice recognition and a moving image capturing. And the application setting may comprise a sampling rate, an image capturing mode by a camera, and a sound capturing mode.

The microphones may be spaced from each other with different spacing distances therebetween, so as to correspond to a sampling rate of a sound required according to an application, and the microphones may be arranged on front/rear surfaces and upper/lower surfaces of the terminal body.

The user's behavior scenario may comprise a voice call in a speaker phone mode, a video call in a state where a user holds the mobile terminal, a selection of a front camera or a rear camera, and a change of a sound capturing mode.

When the sampling rate of the execution application is low, two microphones (microphone combination) far from each other may be selected. On the other hand, when the sampling rate of the execution application is high, two microphones close to each other may be selected.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings.

DETAILED DESCRIPTION OF THE DISCLOSURE

Hereinafter, a mobile terminal according to the present invention will be explained in more detail with reference to the attached drawings. The suffixes attached to components of the wireless speaker, such as 'module' and 'unit or portion' were used for facilitation of the detailed description of the present invention. Therefore, the suffixes do not have different meanings from each other.

A terminal may be implemented in various types. For instance, the terminal in the present description includes a mobile terminal such as a portable phone, a smart phone, a notebook computer, a digital broadcasting terminal, Personal Digital Assistants (PDA), Portable Multimedia Player (PMP), a navigation system, and a fixed terminal such as a digital TV and a desktop computer. It is assumed that the terminal of the present invention is a mobile terminal. However, it will be obvious to those skilled in the art that the present invention may be also applicable to the fixed terminal, except for specific configurations for mobility.

Figure 1:
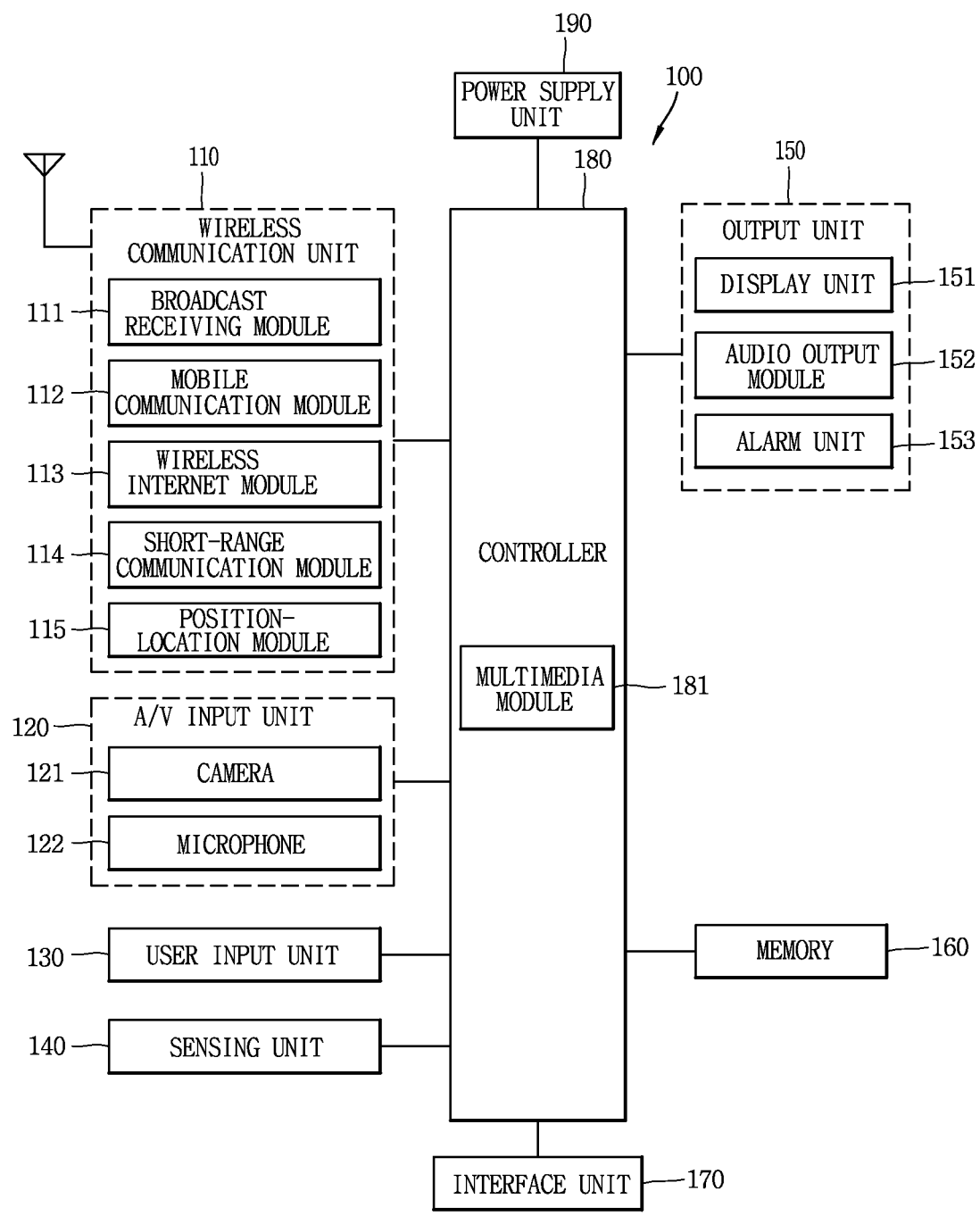
FIG. 1 is a block diagram of a mobile terminal according to a first embodiment of the present invention.

FIG. 1 is a block diagram of a mobile terminal 100 according to an embodiment of the present invention.

As shown in FIG. 1, the mobile terminal 100 includes a wireless communication unit 110, an A/V (Audio/Video) input unit 120, a user input unit 130, a sensing unit 140, an output unit 150, a memory 160, an interface unit 170, a controller 180, and a power supply unit 190. FIG. 1 shows the mobile terminal 100 having various components, but it is understood that implementing all of the illustrated components is not a requirement. The mobile terminal 100 may be implemented by greater or fewer components.

The wireless communication unit 110 typically includes one or more components allowing radio communication between the mobile terminal 100 and a wireless communication system or a network in which the mobile terminal is located. For example, the wireless communication unit may include at least one of a broadcast receiving module 111, a mobile communication module 112, a wireless Internet module 113, a short-range communication module 114, and a location information module 115.

The broadcast receiving module 111 receives broadcast signals and/or broadcast associated information from an external broadcast management server (or other network entity) via a broadcast channel. The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast associated information may refer to information associated with a broadcast channel, a broadcast program or a broadcast service provider. The broadcast signal may include a TV broadcast signal, a radio broadcast signal, a data broadcast signal, and the like. Also, the broadcast signal may further include a broadcast signal combined with a TV or radio broadcast signal.

The broadcast associated information may also be provided via a mobile communication network and, in this case, the broadcast associated information may be received by the mobile communication module 112.

The broadcast signal may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may be configured to receive signals broadcast by using various types of broadcast systems. In particular, the broadcast receiving module 111 may receive a digital broadcast by using a digital broadcast system such as multimedia broadcasting-terrestrial (DMB-T), digital multimedia broadcasting-satellite (DMB-S), digital video broadcast-handheld (DVB-H), the data broadcasting system known as media forward link only (MediaFLO®), integrated services digital broadcast-terrestrial (ISDB-T), etc. The broadcast receiving module 111 may be configured to be suitable for every broadcast system that provides a broadcast signal as well as the above-mentioned digital broadcast systems.

Broadcast signals and/or broadcast-associated information received via the broadcast receiving module 111 may be stored in the memory 160.

The mobile communication module 112 transmits and/or receives radio signals to and/or from at least one of a base station, an external terminal and a server. Such radio signals may include a voice call signal, a video call signal or various types of data according to text and/or multimedia message transmission and/or reception.

The wireless Internet module 113 supports wireless Internet access for the mobile communication terminal. This module may be internally or externally coupled to the mobile terminal 100. Here, as the wireless Internet technique, a wireless local area network (WLAN), Wi-Fi, wireless broadband (WiBro), world interoperability for microwave access (WiMAX), high speed downlink packet access (HSDPA), and the like, may be used.

The short-range communication module 114 is a module for supporting short range communications. Some examples of short-range communication technology include Bluetooth™, Radio Frequency IDentification (RFID), Infrared Data Association (IrDA), Ultra-WideBand (UWB), ZigBee™, and Near Field Communication (NFC). The present invention may be applied not only to the short-range communication module, but also to a short-range communication related module for a user's payment.

The location information module 115 is a module for checking or acquiring a location (or position) of the mobile communication terminal. For example, the location information module 115 may include a GPS (Global Positioning System) module that receives location information from a plurality of satellites. Here, the location information may include coordinate information represented by latitude and longitude values. For example, the GPS module may measure an accurate time and distance from three or more satellites, and accurately calculate a current location of the mobile terminal according to trigonometry based on the measured time and distances. A method of acquiring distance and time information from three satellites and performing error correction with a single satellite may be used. In particular, the GPS module may acquire an accurate time together with three-dimensional speed information as well as the location of the latitude, longitude and altitude values from the location information received from the satellites. Furthermore, the GPS module may acquire speed information by real time calculating a current position.

The A/V input unit 120 is configured to receive an audio or video signal. The A/V input unit 120 may include a camera 121 and a microphone 122. The camera 121 processes image data of still pictures or video acquired by an image capture device in a video capturing mode or an image capturing mode. The processed image frames may be displayed on a display unit 151.

The image frames processed by the camera 121 may be stored in the memory 160 or transmitted via the wireless communication unit 110. Two or more cameras 121 may be provided according to the configuration of the mobile communication terminal.

The microphone 122 may receive sounds (audible data) via a microphone in a phone call mode, a recording mode, a voice recognition mode, and the like, and can process such sounds into audio data. The processed audio (voice) data may be converted for output into a format transmittable to a mobile communication base station via the mobile communication module 112 in case of the phone call mode. The microphone 122 may implement various types of noise canceling (or suppression) algorithms to cancel (or suppress) noise or interference generated in the course of receiving and transmitting audio signals.

The user input unit 130 may generate key input data from commands entered by a user to control various operations of the mobile communication terminal. The user input unit 130 allows the user to enter various types of information, and may include a keypad, a dome switch, a touch pad (e.g., a touch sensitive member that detects changes in resistance, pressure, capacitance, etc. due to being contacted) a jog wheel, a jog switch, and the like. In particular, when the touch pad is overlaid on the display unit 151 in a layered manner, it may be called a touch screen.

The sensing unit 140 detects a current status (or state) of the mobile terminal 100 such as an opened or closed state of the mobile terminal 100, a location of the mobile terminal 100, the presence or absence of a user's touch (contact) with the mobile terminal 100 (e.g., touch inputs), the orientation of the mobile terminal 100, an acceleration or deceleration movement and direction of the mobile terminal 100, etc., and generates commands or signals for controlling the operation of the mobile terminal 100. For example, when the mobile terminal 100 is implemented as a slide type mobile phone, the sensing unit 140 may sense whether the slide phone is open or closed. In addition, the sensing unit 140 can detect whether or not the power supply unit 190 supplies power or whether or not the interface unit 170 is coupled with an external device. The sensing unit 140 may include a proximity sensor 141, which will be later explained in association with a touch screen.

The sensing unit 140 includes a geomagnetic sensor configured to calculate a moving direction when a user moves, a gyro sensor configured to calculate a rotation direction, and an acceleration sensor.

The interface unit 170 serves as an interface by which at least one external device may be connected with the mobile terminal 100. For example, the external devices may include wired or wireless headset ports, an external power supply (or battery charger) ports, wired or wireless data ports, memory card ports, ports for connecting a device having an identification module, audio input/output (I/O) ports, video I/O ports, earphone ports, or the like.

Here, the identification module may be a memory chip that stores various information for authenticating user's authority for using the mobile terminal 100 and may include a user identity module (UIM), a subscriber identity module (SIM) a universal subscriber identity module (USIM), and the like. In addition, the device having the identification module (referred to as the 'identifying device', hereinafter) may take the form of a smart card. Accordingly, the identifying device may be connected with the terminal 100 via a port or other connection mechanisms. The interface unit 170 may be used to receive inputs (e.g., data, information, power, etc.) from an external device and transfer the received inputs to one or more elements within the mobile terminal 100 or may be used to transfer data between the mobile terminal and an external device.

When the mobile terminal 100 is connected with an external cradle, the interface unit 170 may serve as a conduit to allow power from the cradle to be supplied therethrough to the mobile terminal 100 or may serve as a conduit to allow various command signals inputted from the cradle to be transferred to the mobile terminal therethrough. Various command signals or power inputted from the cradle may operate as signals for recognizing when the mobile terminal is properly mounted on the cradle.

The output unit 150 is configured to output audio signals, video signals or alarm signals. The output unit 150 may include the display unit 151, an audio output module 152, an alarm unit 153, and the like.

The display unit 151 may display information processed in the mobile terminal 100. For example, when the mobile terminal 100 is in a phone call mode, the display unit 151 may display a User Interface (UI) or a Graphic User Interface (GUI) associated with a call.

When the display unit 151 and the touch pad are overlaid in a layered manner to form a touch screen, the display unit 151 may function as both an input device and an output device. The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, or the like. Some of these displays may be configured to be transparent so that outside may be seen therethrough, which may be referred to as a transparent display. A representative example of this transparent display may include a transparent organic light emitting diode (TOLED), etc. The mobile terminal 100 may include two or more display units 151. For example, the mobile terminal may include both an external display unit (not shown) and an internal display unit (not shown). The touch screen may be configured to detect a touch input pressure as well as a touch input location and a touch input area.

The audio output module 152 may convert and output as sound audio data received from the wireless communication unit 110 or stored in the memory 160 in a call signal reception mode, a call mode, a record mode, a voice recognition mode, a broadcast reception mode, and the like. Also, the audio output module 152 may provide audible outputs related to a particular function performed by the mobile terminal 100 (e.g., a call signal reception sound, a message reception sound, etc.). The audio output module 152 may include a speaker, a buzzer, and so on.

The alarm unit 153 may provide outputs to inform about the occurrence of an event of the mobile terminal 100. Typical events may include call reception, message reception, key signal inputs, a touch input, etc. In addition to audio or video outputs, the alarm unit 153 may provide outputs in a different manner to inform about the occurrence of an event. For instance, the alarm unit 153 may output signals in a vibration manner. If a call signal or a message is received, the alarm unit 153 may output vibrations. Alternatively, if a key signal is input, the alarm unit 153 may output vibration as a feedback. Through the output of vibrations, a user can recognize the occurrence of an event. The video signal or the audio signal may be also output via the display unit 151 or the audio output module 152.

The memory 160 may store a program for the processing and control of the controller 180. Alternatively, the memory 160 may temporarily store input/output data (e.g., phonebook data, messages, still images, video and the like). Also, the memory 160 may store data relating to various patterns of vibrations and audio output upon the touch input on the touch screen.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the mobile terminal 100 may operate a web storage which performs the storage function of the memory 160 on the Internet.

The interface unit 170 may generally be implemented to interface the mobile terminal with external devices. The interface unit 170 may allow a data reception from an external device, a power delivery to each component in the mobile terminal 100, or a data transmission from the mobile terminal 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like.

The identification module may be configured as a chip for storing various information required to authenticate an authority to use the mobile terminal 100, which may include a User Identity Module (UIM), a Subscriber Identity Module (SIM), a Universal Subscriber Identity Module (USIM), and the like. Also, the device having the identification module (hereinafter, referred to as 'identification device') may be implemented in a type of smart card. Hence, the identification device can be coupled to the mobile terminal 100 via a port.

Also, the interface unit 170 may serve as a path for power to be supplied from an external cradle to the mobile terminal 100 when the mobile terminal 100 is connected to the external cradle or as a path for transferring various command signals inputted from the cradle by a user to the mobile terminal 100. Such various command signals or power inputted from the cradle may operate as signals for recognizing that the mobile terminal 100 has accurately been mounted to the cradle.

The controller 180 typically controls the overall operations of the mobile terminal 100. For example, the controller 180 performs the control and processing associated with telephony calls, data communications, video calls, and the like. The controller 180 may include a multimedia module 181 which provides multimedia playback. The multimedia module 181 may be configured as part of the controller 180 or as a separate component.

The controller 180 can perform a pattern recognition processing so as to recognize writing or drawing input on the touch screen as text or image.

The power supply unit 190 serves to supply power to each component by receiving external power or internal power under control of the controller 180.

Various embodiments described herein may be implemented in a computer-readable medium using, for example, software, hardware, or some combination thereof.

For a hardware implementation, the embodiments described herein may be implemented within one or more of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, micro processors, other electronic units designed to perform the functions described herein, or a selective combination thereof. In some cases, such embodiments are implemented by the controller 180.

For software implementation, the embodiments such as procedures and functions may be implemented together with separate software modules each of which performs at least one of functions and operations. The software codes can be implemented with a software application written in any suitable programming language. Also, the software codes may be stored in the memory 160 and executed by the controller 180.

In addition, the mobile terminal 100 of FIG. 1 may be configured to operate within a communication system which transmits data via frames or packets, including both wireless and wireline communication systems, and satellite-based communication systems.

Figure 2:
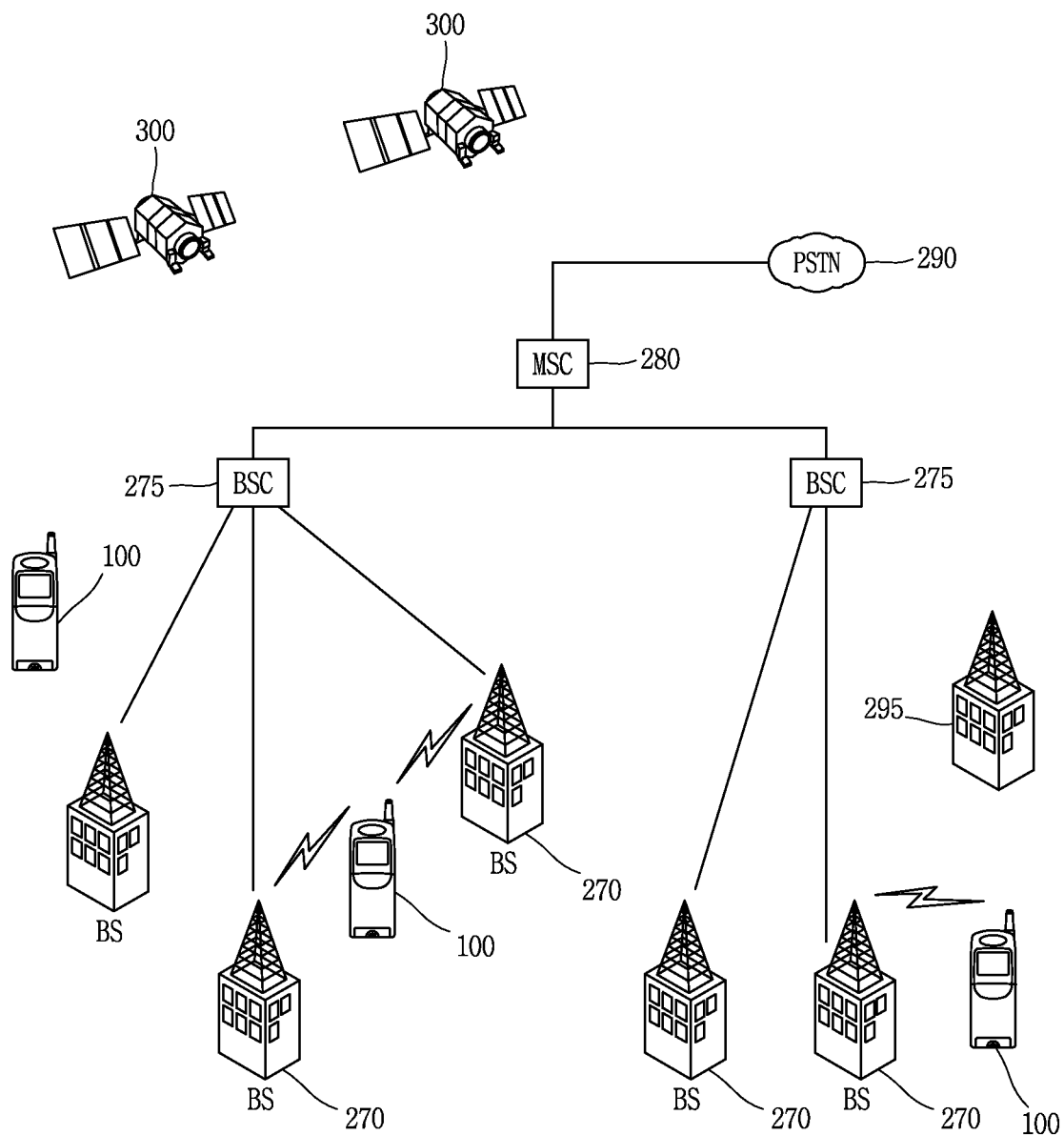
FIG. 2 is a block diagram of a wireless communication system where a mobile terminal according to a first embodiment of the present invention can operate.

FIG. 2 illustrates a wireless communication system where the mobile terminal of the present invention can operate.

As shown in FIG. 2, a wireless communication system may include a plurality of mobile terminals 100, a plurality of base stations 270, a plurality of base station controllers (BSCs) 275, and a mobile switching center (MSC) 280.

The MSC 280 is configured to interface with a public switch telephone network (PSTN) 290, and the MSC 280 is also configured to interface with the BSCs 275. Further, the BSCs 275 are coupled to the base stations 270 via backhaul lines. In addition, the backhaul lines may be configured in accordance with any of several interfaces including, for example, E1/T1, ATM, IP, PPP, Frame Relay, HDSL, ADSL, or xDSL. Further, the system may include more than two BSCs 275.

Also, each base station 270 may include one or more sectors, each sector having an omnidirectional antenna or an antenna pointed in a particular direction radially away from the base station 270. Alternatively, each sector may include two antennas for diversity reception. In addition, each base station 270 may be configured to support a plurality of frequency assignments, with each frequency assignment having a particular spectrum (e.g., 1.25 MHz, 5 MHz).

The intersection of a sector and frequency assignment may be referred to as a CDMA channel. The base stations 270 may also be referred to as base station transceiver subsystems (BTSs). In some instances, the term "base station" may be used to refer collectively to a BSC 275, and one or more base stations 270. The base stations 270 may also be denoted as "cell sites." Alternatively, individual sectors of a given base station 270 may be referred to as cell sites.

As shown in FIG. 2, a broadcasting transmitter (BT) 295 is configured to transmit broadcast signals to the mobile terminals 100 which operate within the system. In addition, the broadcast receiving module 111 (FIG. 1) of the mobile terminal 100 is typically configured to receive broadcast signals transmitted by the BT 295.

FIG. 2 further illustrates several global positioning system (GPS) satellites 300. Such satellites 300 facilitate locating the position of some or all of the mobile terminals 100. In FIG. 2, two satellites are shown, but positioning information may be obtained with greater or fewer satellites. In addition, the position-location module 115 (FIG. 1) of the mobile terminal 100 is typically configured to cooperate with the satellites 300 to obtain desired position information. However, other types of position detection technology, such as location technology that may be used in addition to or instead of GPS location technology, may alternatively be implemented. Some or all of the GPS satellites 300 may alternatively or additionally be configured to provide satellite DMB transmissions.

Further, during typical operation of the wireless communication system, the base stations 270 receive sets of reverse-link signals from various mobile terminals 100. The mobile terminals 100 engage in calls, messaging, and other communications. In addition, each reverse-link signal received by a given base station 270 is processed within that base station 270, and the resulting data is forwarded to an associated BSC 275. The BSC 275 provides call resource allocation and mobility management functionality including soft handoffs between the base stations 270. Further, the BSCs 275 also route the received data to the MSC 280, which provides additional routing services for interfacing with the PSTN 290. Similarly, the PSTN 290 interfaces with the MSC 280, and the MSC 280 interfaces with the BSCs 275. The BSCs 275 also control the base stations 270 to transmit sets of forward-link signals to the mobile terminals 100.

In order to capture a sound from a sound source, directivity with respect to sound sources disposed on a horizontal axis or a vertical axis based on a user, should be selected. For such selective directivity, a plurality of microphones are arranged on a rear surface of a mobile terminal so as to cross each other.

In case of using only two microphones, the two microphones are arranged in a spaced manner from each other, in a direction of a horizontal or vertical straight line. Such directivity is performed through a signal processing such as beam-forming with respect to sound (e.g., voice) captured using a plurality of microphones. The beam-forming indicates generating directivity by forming a range to be captured into a sound beam.

A microphone mounting structure according to the present invention is applied to various sound-capturing methods implemented through combination between events and an audio zooming technique. The events indicate a user's operation to select a position, a range and a situation of a target subject, in order to obtain an optimum image through an image capturing process or an image reproducing process.

The image during playback includes not only an image stored with an audio zooming technique, but also an image stored without an audio zooming technique.

The audio zooming technique applied to the present invention indicates an operation to capture a sound from a sound source using two microphones, and then to record only a desired sound by applying audio zooming, or to reproduce the recorded sound by applying audio zooming. For instance, a subject undergoes a close-up process or is focalized by a user. Then, directivity of microphones is controlled or a sound capturing range is optimized, by interwork with the position and the size of the subject. Under such configuration, a sound of the subject is captured in an optimum manner or the captured sound is reproduced.

Figure 3A:
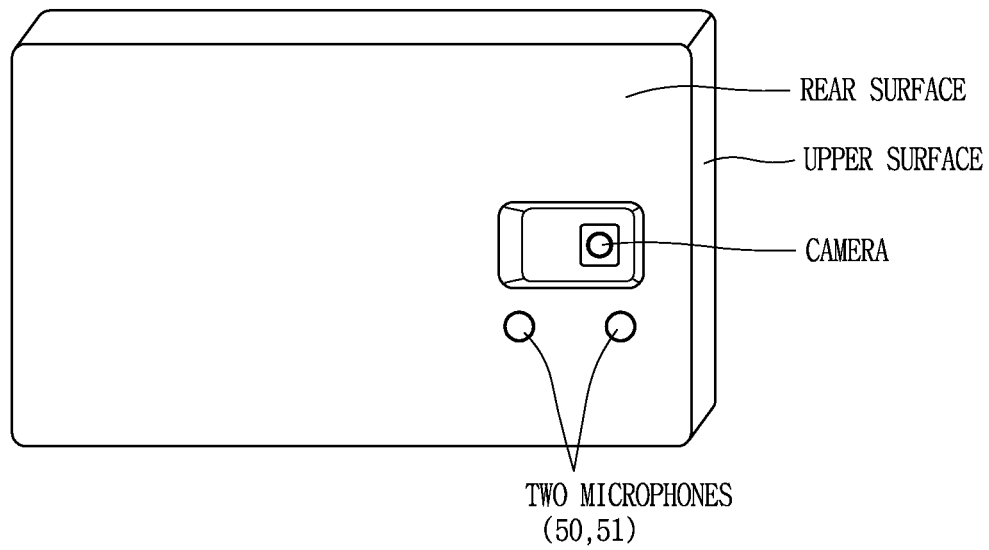
FIGS. 3A and 3B are views illustrating a microphone mounting structure of a mobile terminal in accordance with the conventional art.
Figure 3B:
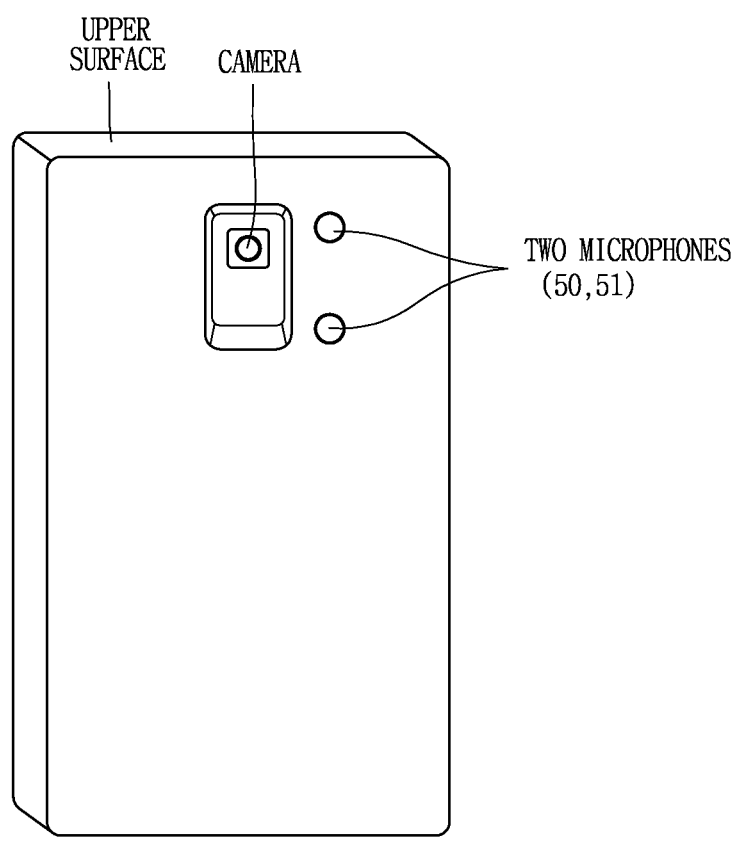

FIGS. 3A and 3B illustrate a general microphone mounting structure of a mobile terminal.

As shown in FIGS. 3A and 3B, two microphones 50 and 51 are arranged on a rear surface of a mobile terminal, on the same straight line, in a spaced manner from each other. That is, when the mobile terminal is in a horizontal view state, the two microphones 50 and 51 are arranged on the rear surface of the mobile terminal in a horizontal direction, on the same straight line, in a spaced manner from each other (refer to FIG. 3A). On the other hand, when the mobile terminal is in a vertical view state, the two microphones 50 and 51 are arranged on the rear surface of the mobile terminal in a vertical direction, on the same straight line, in a spaced manner from each other (refer to FIG. 3B). The reason why two microphones are arranged with a spacing distance therebetween is in order to capture a sound using the two microphones, and to implement a stereo mode by two channels.

However, such conventional mounting structure has the following problems.

When capturing an image in a case where the mobile terminal is in a horizontal view state as shown in FIG. 3A, a sound of a subject distributed on a horizontal axis based on a user can be captured. However, in this case, a sound of a subject distributed on a vertical axis cannot be captured. When capturing an image in a case where the mobile terminal is in a vertical view state as shown in FIG. 3B, a sound of a subject distributed on a vertical axis based on a user can be captured. However, in this case, a sound of a subject distributed on a horizontal axis cannot be captured.

Therefore, the present invention provides an optimum microphone mounting structure capable of capturing a sound of a subject in an optimum manner, even if a mobile terminal is in a horizontal view state (horizontal state) or is in a vertical view state (vertical state) in order to capture an image. That is, the present invention provides a method for capturing a sound or a voice of a subject in an optimum manner, by providing an optimum microphone mounting structure using two microphones. Under such optimum microphone mounting structure, the conventional problem that a function of a mobile terminal is restricted according to a rotation angle of the mobile terminal, can be overcome, and two microphones are mounted (arranged) to the mobile terminal for a minimized mounting space.

In one embodiment, a first microphone and a second microphone are arranged on different axes on the same surface of the mobile terminal. For example, the first microphone is arranged on a horizontal axis, whereas the second microphone is arranged on a vertical axis. Alternatively, the first microphone is arranged on a vertical axis, whereas the second microphone is arranged on a horizontal axis.

The first microphone and the second microphone are arranged to have the same spacing distance in directions of a horizontal axis and a vertical axis. The reason is in order to prevent the occurrence of a difference between sounds captured by the first microphone and the second microphone. The first microphone and the second microphone form an angle of 45° therebetween by the same spacing distance.

The same spacing distance (the interval between the microphones) is 1.45 cm based on a sampling speed of 22.05 KHz. However, the interval between the microphones is not limited to 1.45 cm, but may be variable according to a sampling speed.

In a modified embodiment, the first microphone and the second microphone may be arranged to have different spacing distances in directions of a horizontal axis and a vertical axis. In this case, the first microphone and the second microphone form an angle rather than 45° therebetween, due to the different spacing distances.

In another embodiment, the first microphone and the second microphone are arranged on different axes on different surfaces. As an example, the first microphone is arranged on a horizontal axis, while the second microphone is arranged on a vertical axis. As another example, the first microphone is arranged on a vertical axis, while the second microphone is arranged on a horizontal axis.

In this case, the first microphone and the second microphone may be arranged to have the same spacing distance, or different spacing distances in directions of the horizontal axis and the vertical axis.

In a case where the first microphone and the second microphone have the same spacing distance (e.g., 1.45 cm) in directions of the horizontal axis and the vertical axis, the first microphone and the second microphone form an angle of 45° therebetween. On the other hand, in a case where the first microphone and the second microphone have different spacing distances in directions of the horizontal axis and the vertical axis, the first microphone and the second microphone form an angle rather than 45° therebetween.

Figure 4:
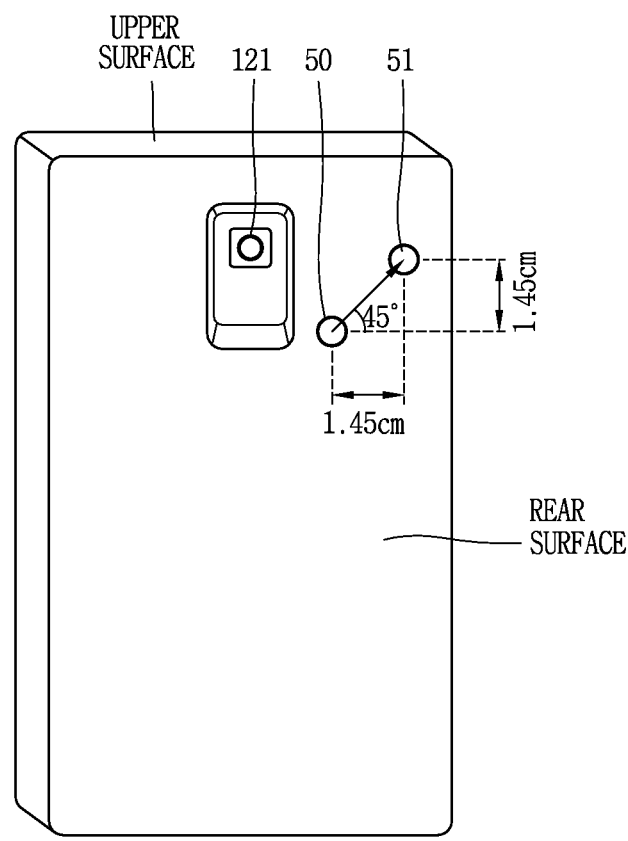
FIG. 4 is a view illustrating a microphone mounting structure of a mobile terminal according to a first embodiment of the present invention.

FIG. 4 is a view illustrating a microphone mounting structure of a mobile terminal according to a first embodiment of the present invention.

Referring to FIG. 4, the microphone mounting structure of a mobile terminal according to a first embodiment of the present invention indicates a structure where a first microphone 50 and a second microphone 51 are arranged on the same surface (i.e., rear surface) of the terminal body.

The first microphone 50 and the second microphone 51 are arranged on the right of the rear camera 121, and are arranged on different axes based on a user. For instance, the first microphone 50 is arranged on a horizontal axis, whereas the second microphone 51 is arranged on a vertical axis.

The first microphone 50 and the second microphone 51 are arranged to have the same spacing distance (e.g., 1.45 cm) in directions of a horizontal axis and a vertical axis. That is, the second microphone 51 is firstly arranged at a position having a horizontal spacing distance of 1.45 cm from the first microphone 50, and then is arranged at a position having a vertical spacing distance of 1.45 cm from the first microphone 50. As a result, the interval between the first microphone 50 and the second microphone 51 on the horizontal axis is 1.45 cm, and the interval between the first microphone 50 and the second microphone 51 on the vertical axis is 1.45 cm.

Once the first microphone 50 and the second microphone 51 are arranged, the first microphone 50 and the second microphone 51 are positioned at vertexes of a right triangle so as to have an angle of 45° therebetween.

Referring to FIG. 4, the first microphone 50 and the second microphone 51 have the same spacing distance in directions of the horizontal axis and the vertical axis. However, the first microphone 50 and the second microphone 51 may be arranged to have different spacing distances. Such modification embodiment is applied to all embodiments which are to be explained later. For convenience, the present invention will be explained under an assumption that the first microphone 50 and the second microphone 51 are arranged to have the same spacing distance in directions of the horizontal axis and the vertical axis.

Figure 5:
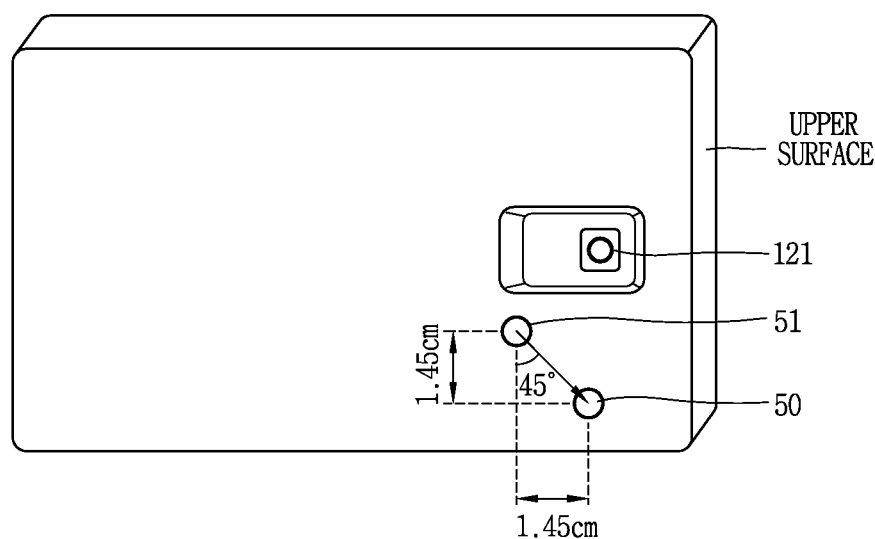
FIG. 5 is a view illustrating the microphone mounting structure of FIG. 4 when the mobile terminal is in a horizontal view state.

FIG. 5 is a view illustrating the microphone mounting structure of FIG. 4 when the mobile terminal is in a horizontal view state.

The microphone mounting structure of FIG. 5 is the same as that of FIG. 4 except that the axes, on which the first microphone 50 and the second microphone 51 are positioned, are changed based on a user, when the mobile terminal is in a horizontal view state. That is, the first microphone 50 is positioned on the vertical axis, whereas the second microphone 51 is positioned on the horizontal axis.

Figure 6A:
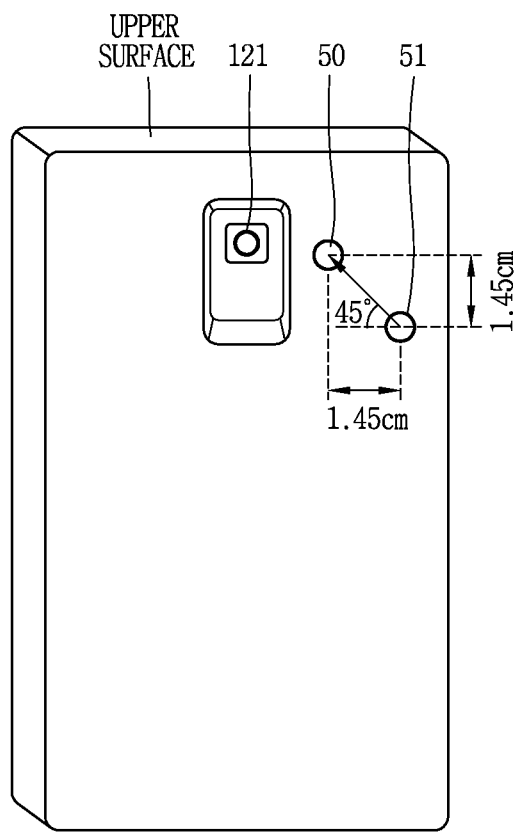
FIGS. 6A to 6C are views illustrating a modification embodiment of a microphone mounting structure of a mobile terminal according to a first embodiment of the present invention.
Figure 6B:
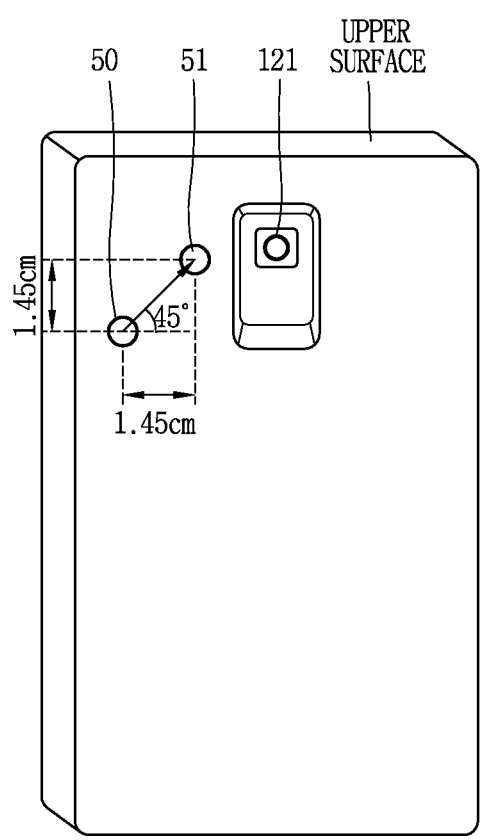
Figure 6C:
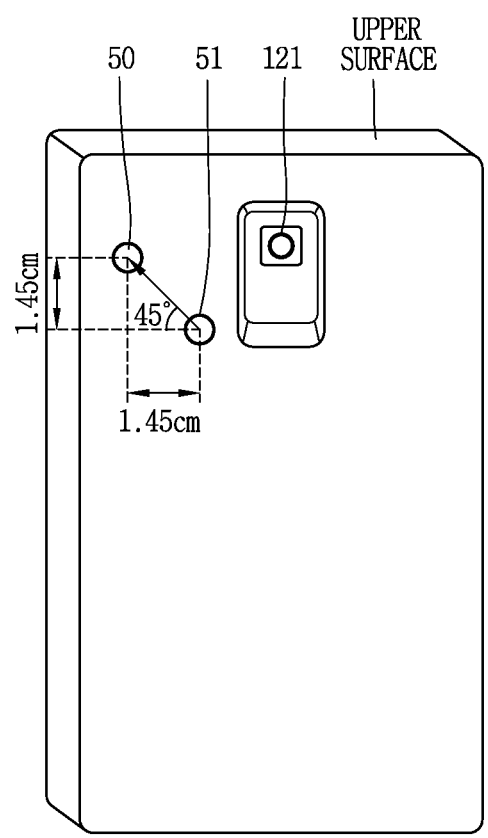

FIGS. 6A to 6C are views illustrating a modification embodiment of a microphone mounting structure of a mobile terminal according to a first embodiment of the present invention.

FIG. 6A illustrates a structure where the axial directions of the first microphone 50 and the second microphone 51 shown in FIG. 4 are changed. More specifically, when the mobile terminal is in a vertical view state, the first microphone 50 is arranged in a direction of the vertical axis, whereas the second microphone 51 is arranged in a direction of the horizontal axis.

FIG. 6B illustrates the same microphone mounting structure as that of FIG. 4 in position and angle of the first microphone 50 and the second microphone 51. Referring to FIG. 6, the first microphone 50 and the second microphone 51 are arranged on the left of the rear camera 121.

FIG. 6C illustrates a structure where the axial directions of the first microphone 50 and the second microphone 51 shown in FIG. 6B are changed. More specifically, when the mobile terminal is in a vertical view state, the first microphone 50 is arranged in a direction of the vertical axis, whereas the second microphone 51 is arranged in a direction of the horizontal axis.

Figure 7:
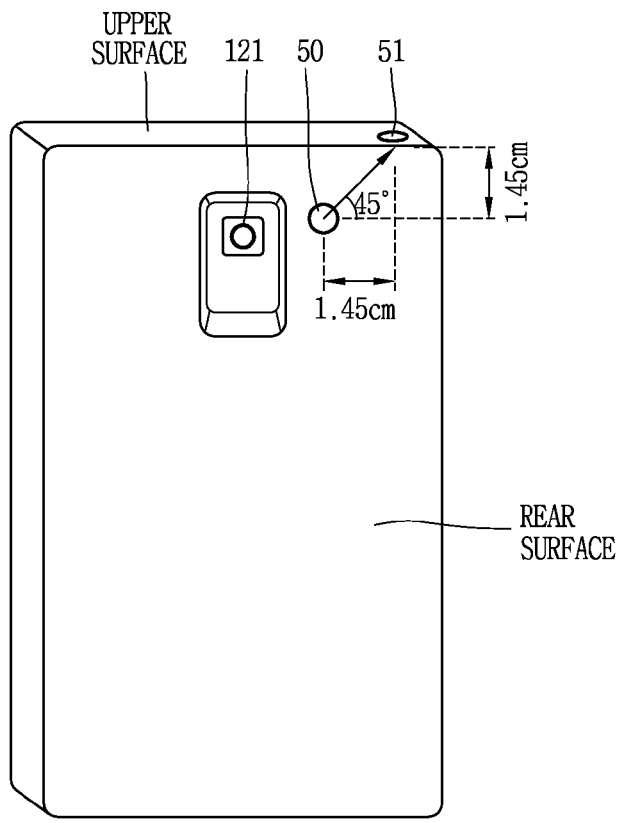
FIG. 7 is a view illustrating a microphone mounting structure of a mobile terminal according to a second embodiment of the present invention.

FIG. 7 is a view illustrating a microphone mounting structure of a mobile terminal according to a second embodiment of the present invention.

As shown in FIG. 7, in the microphone mounting structure of a mobile terminal according to a second embodiment of the present invention, the first microphone 50 and the second microphone 51 are arranged on different surfaces of the terminal body.

For instance, the first microphone 50 is arranged on a rear surface of the terminal body, whereas the second microphone 51 is arranged on an upper surface of the terminal body. The first microphone 50 is a rear microphone, and the second microphone is an upper microphone.

The first microphone 50 and the second microphone 51 are arranged on the right of the rear camera 121, and are positioned on different axes based on a user. For instance, the first microphone 50 is positioned on the horizontal axis, whereas the second microphone 51 is positioned on the vertical axis.

The first microphone 50 and the second microphone 51 are spaced from each other with the same distance (1.45 cm) in directions of the horizontal axis and the vertical axis. That is, the second microphone 51 is firstly arranged at a position having a horizontal spacing distance of 1.45 cm from the first microphone 50, and then is arranged at a position having a vertical spacing distance of 1.45 cm from the first microphone 50. The second microphone 51 is positioned on the right of the first microphone 50, at an angle of 45°.

Figure 8:
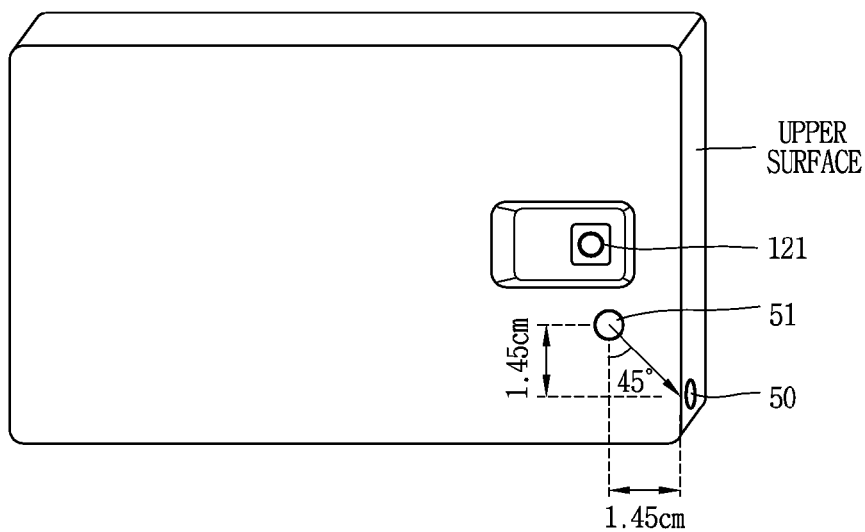
FIG. 8 is a view illustrating the microphone mounting structure of FIG. 7 when the mobile terminal is in a horizontal view state.

FIG. 8 is a view illustrating the microphone mounting structure of FIG. 7 when the mobile terminal is in a horizontal view state.

The microphone mounting structure of FIG. 8 is the same as that of FIG. 7 except that the axes, on which the first microphone 50 and the second microphone 51 are positioned, are changed based on a user, when the mobile terminal is in a horizontal view state. That is, the first microphone 50 is positioned on the vertical axis, whereas the second microphone 51 is positioned on the horizontal axis.

Figure 9A:
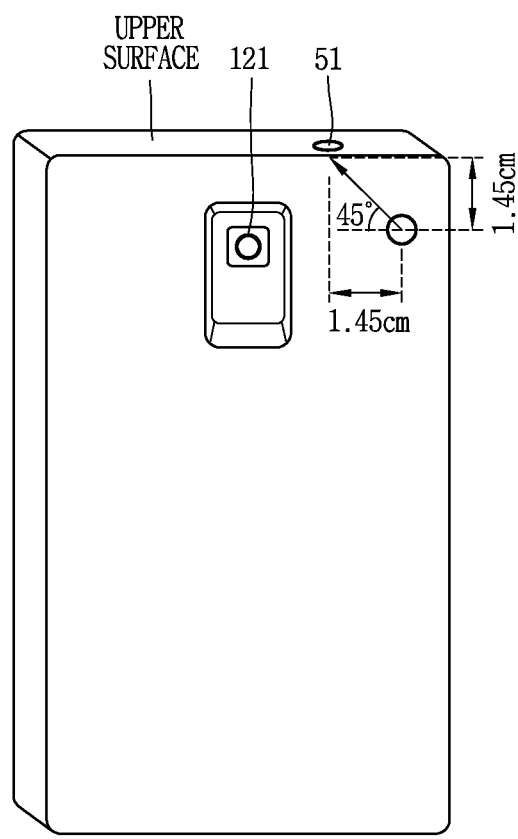
FIGS. 9A to 9C are views illustrating a modification embodiment of a microphone mounting structure of a mobile terminal according to a second embodiment of the present invention.
Figure 9B:
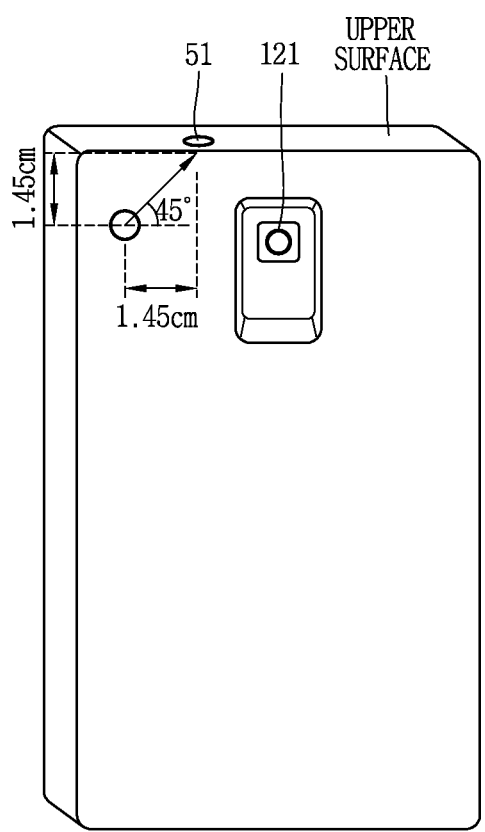
Figure 9C:
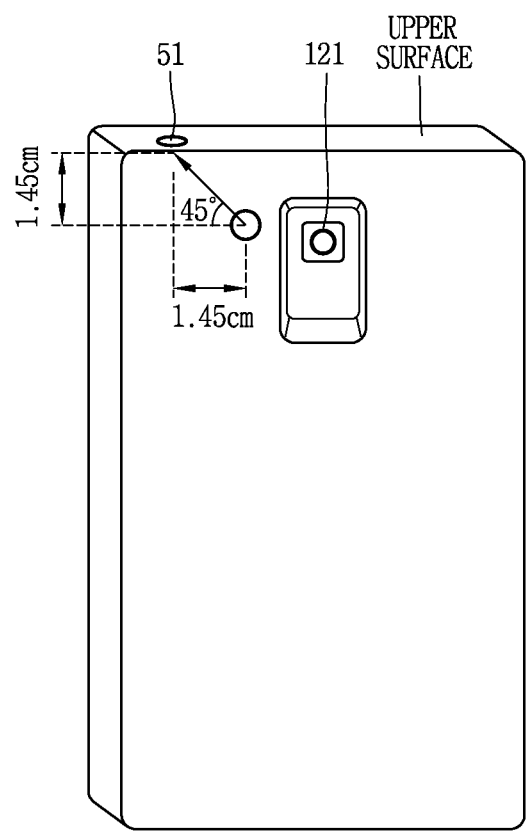

FIGS. 9A to 9C are views illustrating a modification embodiment of a microphone mounting structure of a mobile terminal according to a second embodiment of the present invention.

FIG. 9A illustrates a structure where the axial directions of the first microphone 50 and the second microphone 51 shown in FIG. 7 are changed. More specifically, when the mobile terminal is in a vertical view state, the first microphone 50 is arranged in a direction of the vertical axis, whereas the second microphone 51 is arranged in a direction of the horizontal axis.

FIG. 9B illustrates the same microphone mounting structure as that of FIG. 7 in position and angle of the first microphone 50 and the second microphone 51. Referring to FIG. 9B, the first microphone 50 and the second microphone 51 are arranged on the left of the rear camera 121.

FIG. 9C illustrates a structure where the axial directions of the first microphone 50 and the second microphone 51 shown in FIG. 9B are changed. More specifically, when the mobile terminal is in a vertical view state, the first microphone 50 is arranged in a direction of the vertical axis, whereas the second microphone 51 is arranged in a direction of the horizontal axis.

Figure 10:
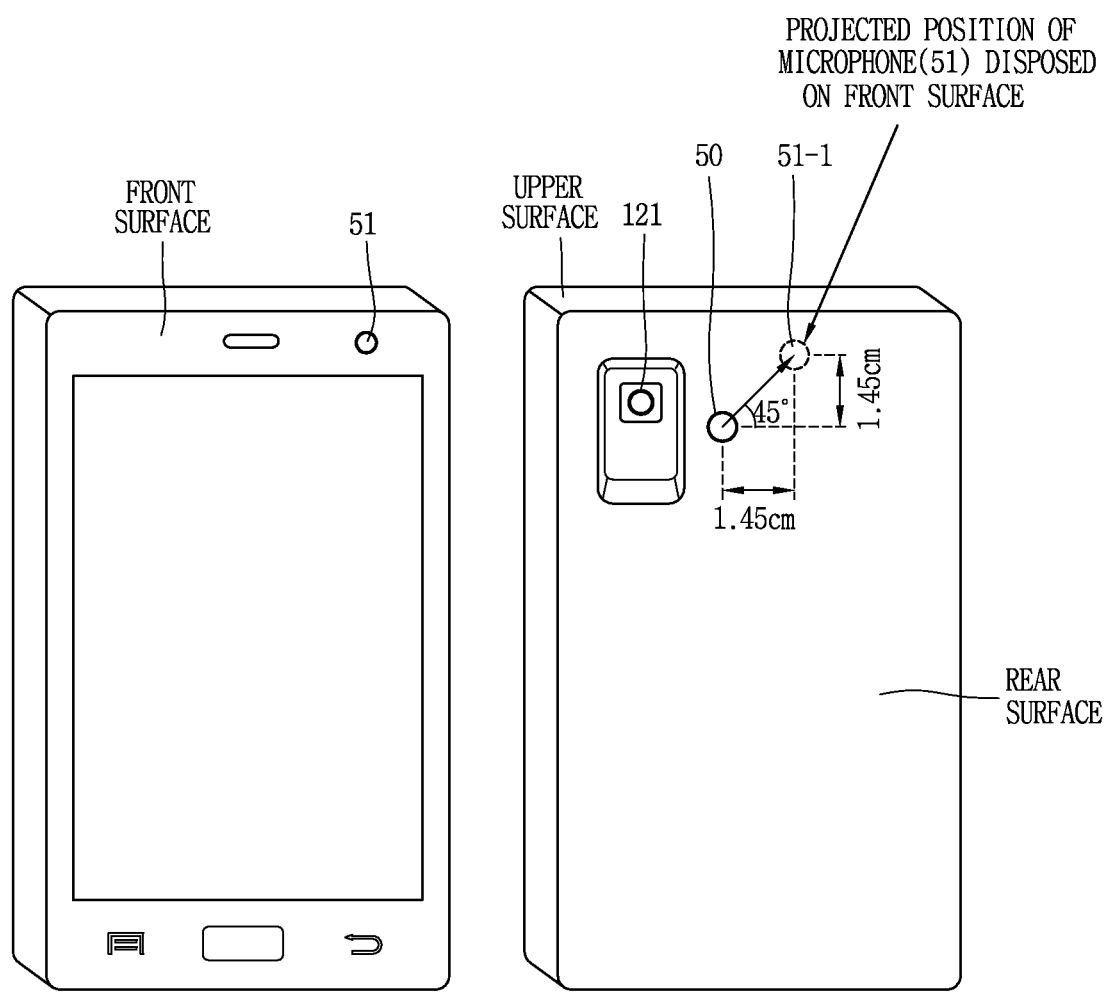
FIG. 10 is a view illustrating a microphone mounting structure of a mobile terminal according to a third embodiment of the present invention.

FIG. 10 is a view illustrating a microphone mounting structure of a mobile terminal according to a third embodiment of the present invention.

As shown in FIG. 10, in the microphone mounting structure of a mobile terminal according to a third embodiment of the present invention, the first microphone 50 and the second microphone 51 are arranged on different surfaces of the terminal body.

For instance, the first microphone 50 is arranged on a rear surface of the terminal body, whereas the second microphone 51 is arranged on a front surface of the terminal body. The first microphone 50 is a rear microphone, and the second microphone is a front microphone.

The first microphone 50 and the second microphone 51 are arranged on the right of the rear camera 121, and are positioned on different axes based on a user. For instance, the first microphone 50 is arranged on the horizontal axis, whereas the second microphone 51 is arranged on a prescribed position on the front surface so that its projected position 51-1 can be arranged on the vertical axis.

The first microphone 50 and the second microphone 51 are spaced from each other with the same distance (1.45 cm) in directions of the horizontal axis and the vertical axis. That is, the second microphone 51 is arranged on the front surface of the terminal body so that it can be projected onto a position, the position formed by having a horizontal spacing distance of 1.45 cm from the first microphone 50, and then having a vertical spacing distance of 1.45 cm from the first microphone 50. The projected position 51-1 of the second microphone 51 can be at 45°, on the upper right side of the first microphone 50.

Figure 11:
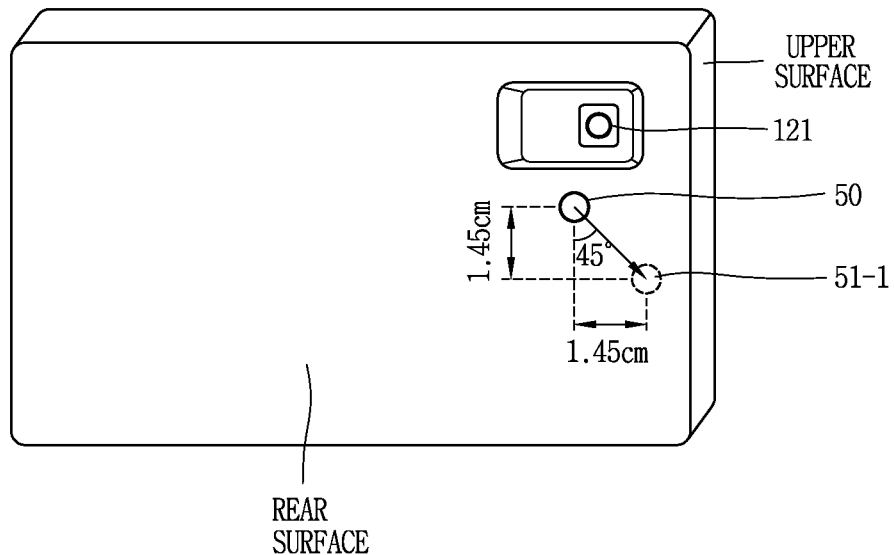
FIG. 11 is a view illustrating the microphone mounting structure of FIG. 10 when the mobile terminal is in a horizontal view state.

FIG. 11 is a view illustrating the microphone mounting structure of FIG. 10 when the mobile terminal is in a horizontal view state.

The microphone mounting structure of FIG. 11 is the same as that of FIG. 10 except that the axes, on which the first microphone 50 and the second microphone 51 are positioned, are changed based on a user, when the mobile terminal is in a horizontal view state. That is, the first microphone 50 is positioned on the vertical axis, whereas the projected position 51-1 of the second microphone 51 is positioned on the horizontal axis.

Figure 12A:
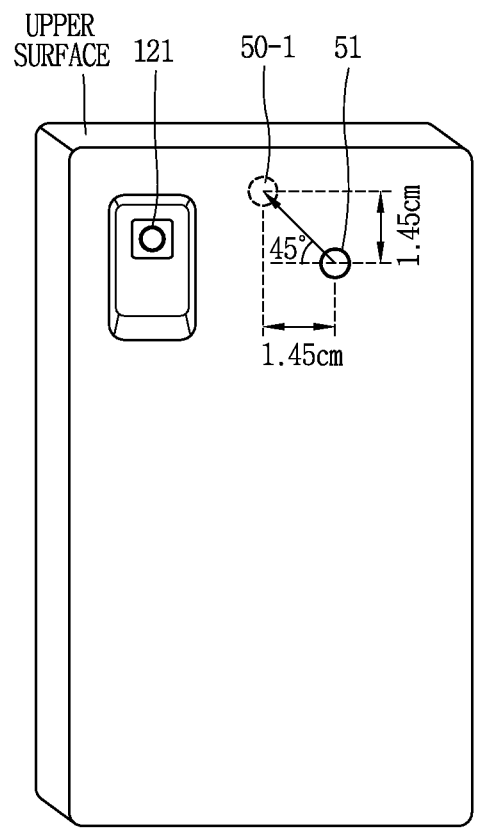
FIGS. 12A to 12C are views illustrating a modification embodiment of a microphone mounting structure of a mobile terminal according to a third embodiment of the present invention.
Figure 12B:
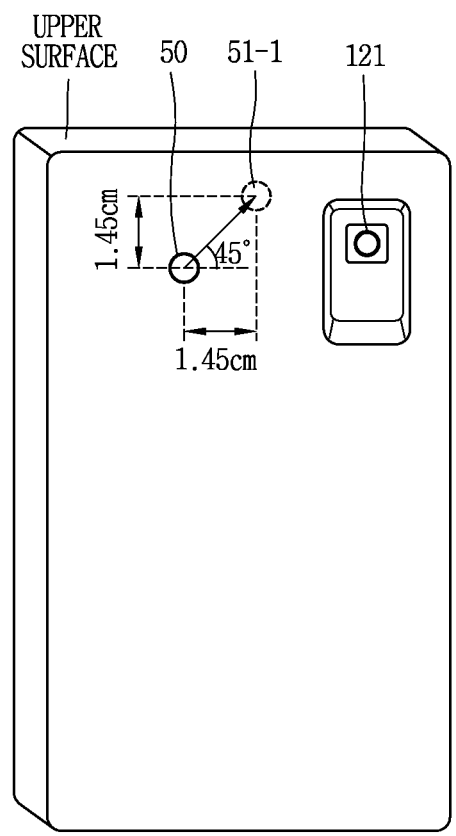
Figure 12C:
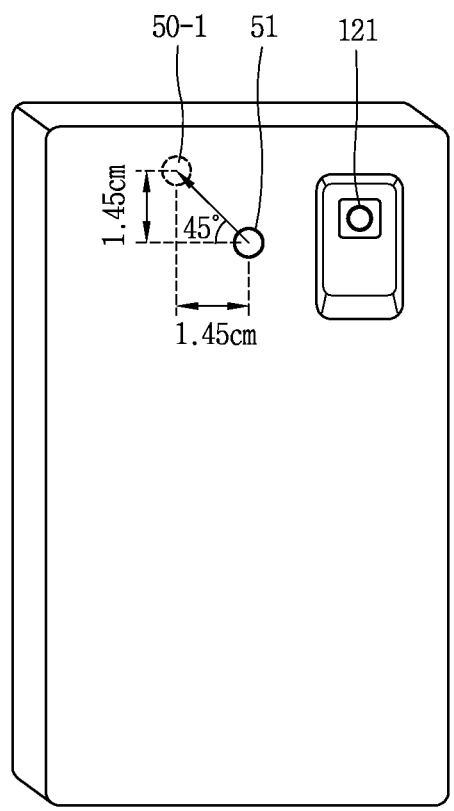

FIGS. 12A to 12C are views illustrating a modification embodiment of a microphone mounting structure of a mobile terminal according to a third embodiment of the present invention.

FIG. 12A illustrates a structure where the axial directions of the first microphone 50 and the second microphone 51 shown in FIG. 10 are changed. More specifically, when the mobile terminal is in a vertical view state, a projected position 50-1 of the first microphone 50 is arranged in a direction of the vertical axis, whereas the second microphone 51 is arranged in a direction of the horizontal axis.

FIG. 12B illustrates the same microphone mounting structure as that of FIG. 10 in position and angle of the first microphone 50 and the second microphone 51. Referring to FIG. 12B, the first microphone 50 and the second microphone 51 are arranged on the left of the rear camera 121.

FIG. 12C illustrates the same microphone mounting structure as that of FIG. 12A in position and angle of the first microphone 50 and the second microphone 51. Referring to FIG. 12C, the first microphone 50 and the second microphone 51 are arranged on the left of the rear camera 121. More specifically, when the mobile terminal is in a vertical view state, the projected position 50-1 of the first microphone 50 is arranged in a direction of the vertical axis, whereas the second microphone 51 is arranged in a direction of the horizontal axis.

Figure 13:
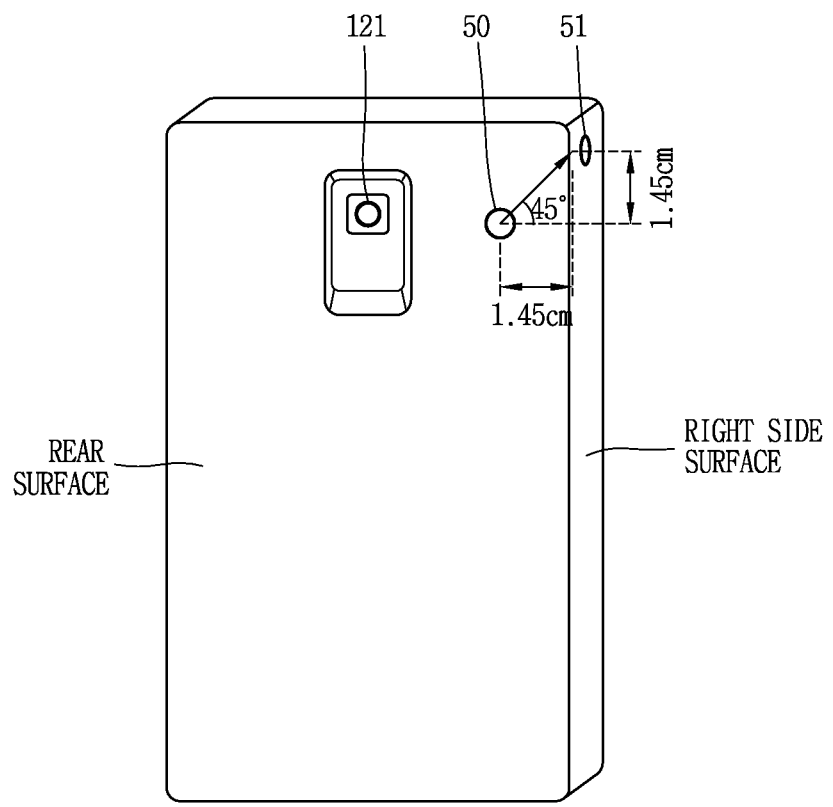
FIG. 13 is a view illustrating a microphone mounting structure of a mobile terminal according to a fourth embodiment of the present invention.

FIG. 13 is a view illustrating a microphone mounting structure of a mobile terminal according to a fourth embodiment of the present invention.

As shown in FIG. 13, in the microphone mounting structure of a mobile terminal according to a fourth embodiment of the present invention, the first microphone 50 and the second microphone 51 are arranged on different surfaces of the terminal body.

For instance, the first microphone 50 is arranged on a rear surface of the terminal body, whereas the second microphone 51 is arranged on a right side surface of the terminal body. The first microphone 50 is a rear microphone, and the second microphone is a side microphone.

The first microphone 50 and the second microphone 51 are arranged on the right of the rear camera 121, and are positioned on different axes based on a user. For instance, the first microphone 50 is positioned on the horizontal axis, whereas the second microphone 51 is positioned on an upper right side surface so as to be arranged on the vertical axis.

The first microphone 50 and the second microphone 51 are spaced from each other with the same distance (1.45 cm) in directions of the horizontal axis and the vertical axis. That is, the second microphone 51 is arranged at a position having a horizontal spacing distance of 1.45 cm from the first microphone 50, and then is arranged at a position having a vertical spacing distance of 1.45 cm from the first microphone 50. The second microphone 51 is positioned on the right upper end based on the first microphone 50, at an angle of 45°.

Figure 14:
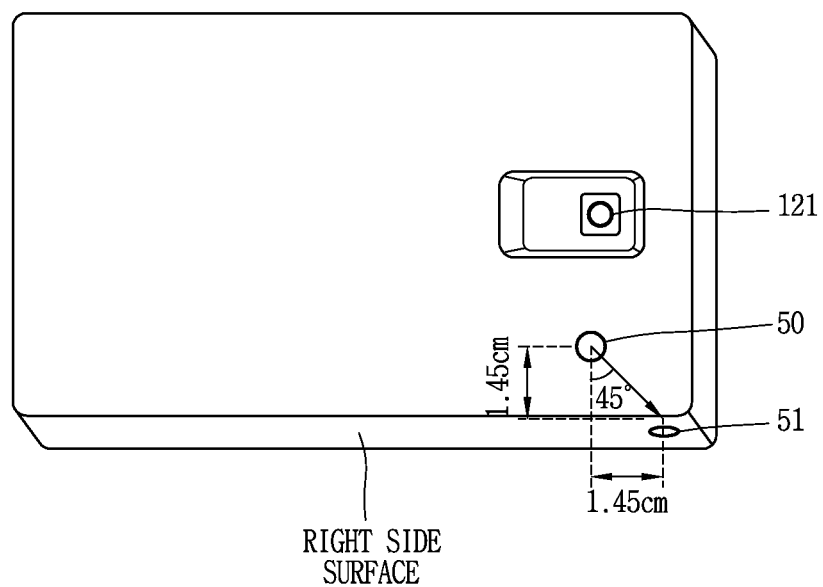
FIG. 14 is a view illustrating the microphone mounting structure of FIG. 13 when the mobile terminal is in a horizontal view state.

FIG. 14 is a view illustrating the microphone mounting structure of FIG. 13 when the mobile terminal is in a horizontal view state.

The microphone mounting structure of FIG. 14 is the same as that of FIG. 13 except that the axes, on which the first microphone 50 and the second microphone 51 are positioned, are changed based on a user, when the mobile terminal is in a horizontal view state. That is, the first microphone 50 is positioned on the vertical axis, whereas the second microphone 51 is positioned on the horizontal axis.

Figure 15A:
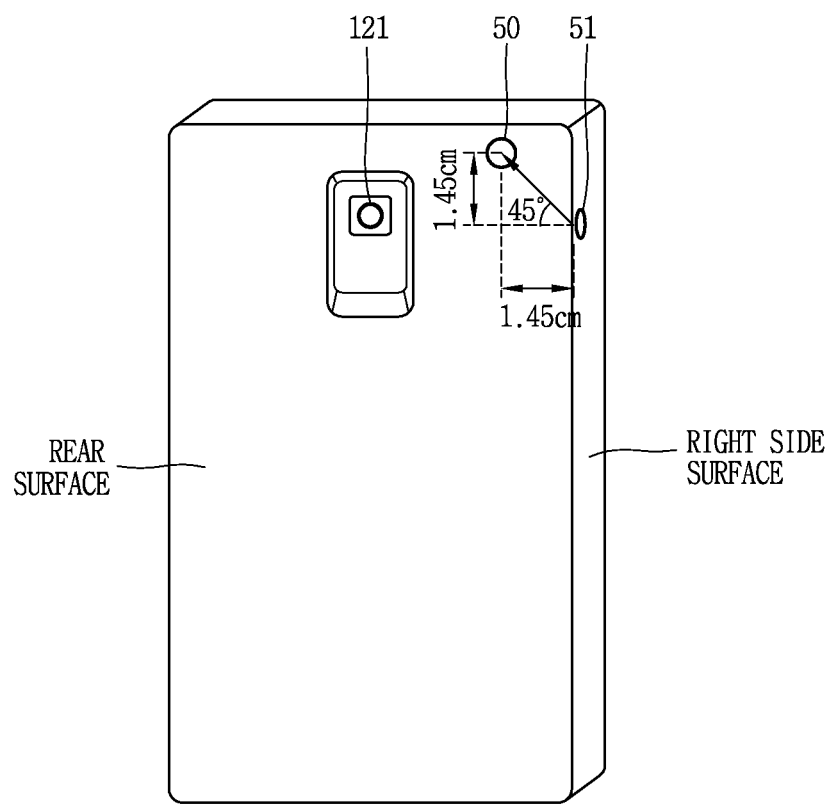
FIGS. 15A to 15C are views illustrating a modification embodiment of a microphone mounting structure of a mobile terminal according to a fourth embodiment of the present invention.
Figure 15B:
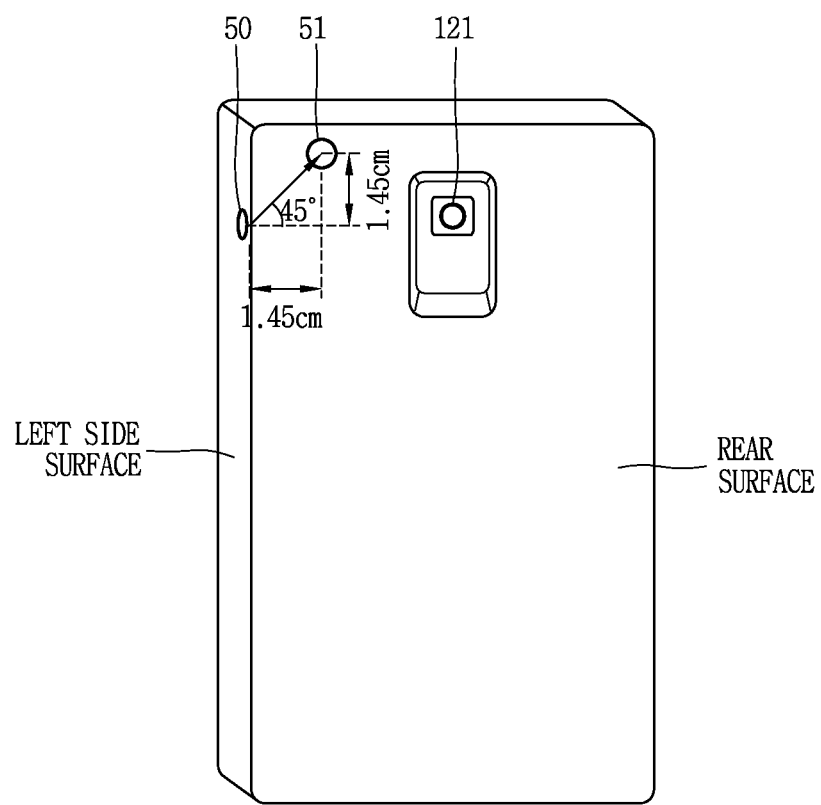
Figure 15C:
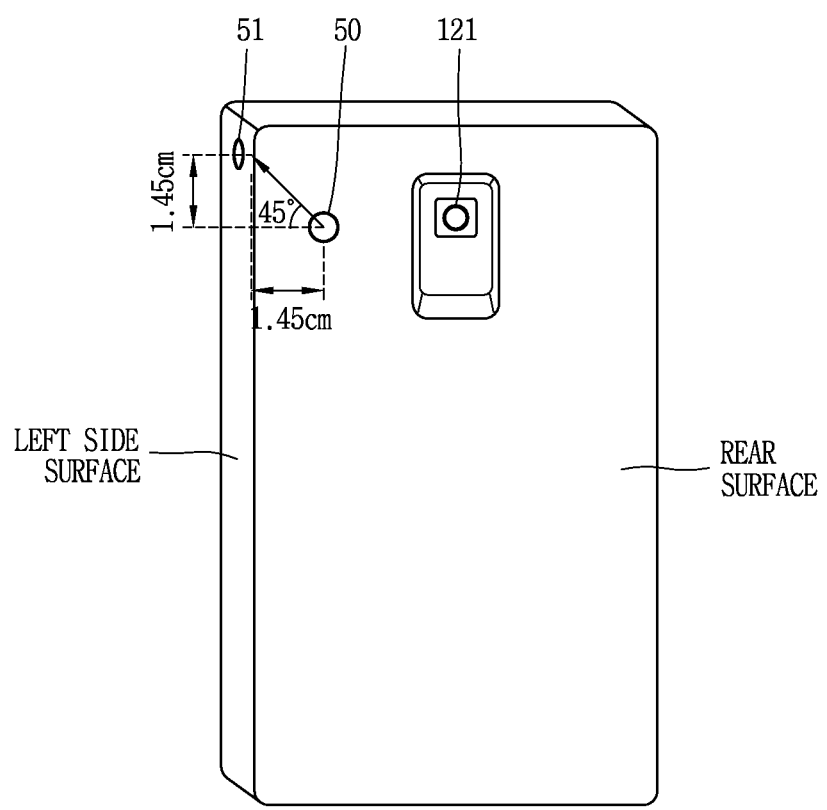

FIGS. 15A to 15C are views illustrating a modification embodiment of a microphone mounting structure of a mobile terminal according to a fourth embodiment of the present invention.

FIG. 15A illustrates a structure where the axial directions of the first microphone 50 and the second microphone 51 shown in FIG. 13 are changed. More specifically, when the mobile terminal is in a vertical view state, the first microphone 50 is arranged in a direction of the vertical axis, whereas the second microphone 51 is arranged in a direction of the horizontal axis.

FIG. 15B illustrates the same microphone mounting structure as that of FIG. 13 in position and angle of the first microphone 50 and the second microphone 51. Referring to FIG. 15B, the first microphone 50 and the second microphone 51 are arranged on the left of the rear camera 121.

FIG. 15C illustrates the same microphone mounting structure as that of FIG. 15A in position and angle of the first microphone 50 and the second microphone 51. Referring to FIG. 15C, the first microphone 50 and the second microphone 51 are arranged on the left of the rear camera 121.

Figure 16:
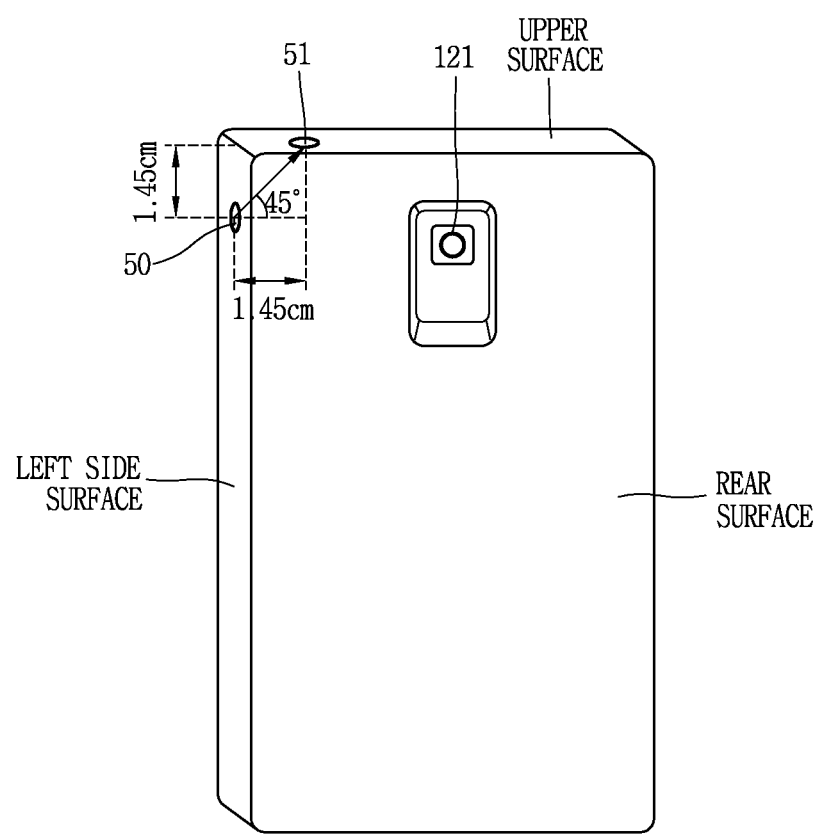
FIG. 16 is a view illustrating a microphone mounting structure of a mobile terminal according to a fifth embodiment of the present invention.

FIG. 16 is a view illustrating a microphone mounting structure of a mobile terminal according to a fifth embodiment of the present invention.

As shown in FIG. 16, in the microphone mounting structure of a mobile terminal according to a fifth embodiment of the present invention, the first microphone 50 and the second microphone 51 are arranged on different surfaces of the terminal body.

For instance, the first microphone 50 is arranged on a left side surface of the terminal body, whereas the second microphone 51 is arranged on an upper surface of the terminal body. The first microphone 50 is a side microphone, and the second microphone is an upper microphone.

The first microphone 50 and the second microphone 51 are arranged on the right of the rear camera 121, and are positioned on different axes based on a user. For instance, the first microphone 50 is positioned on the horizontal axis, whereas the second microphone 51 is positioned on an upper surface so as to be arranged on the vertical axis.

The first microphone 50 and the second microphone 51 are spaced from each other with the same distance (1.45 cm) in directions of the horizontal axis and the vertical axis. That is, the second microphone 51 is arranged at a position having a horizontal spacing distance of 1.45 cm from the first microphone 50, and then is arranged at a position having a vertical spacing distance of 1.45 cm from the first microphone 50. The second microphone 51 is positioned on the right upper end based on the first microphone 50, at an angle of 45°.

Figure 17:
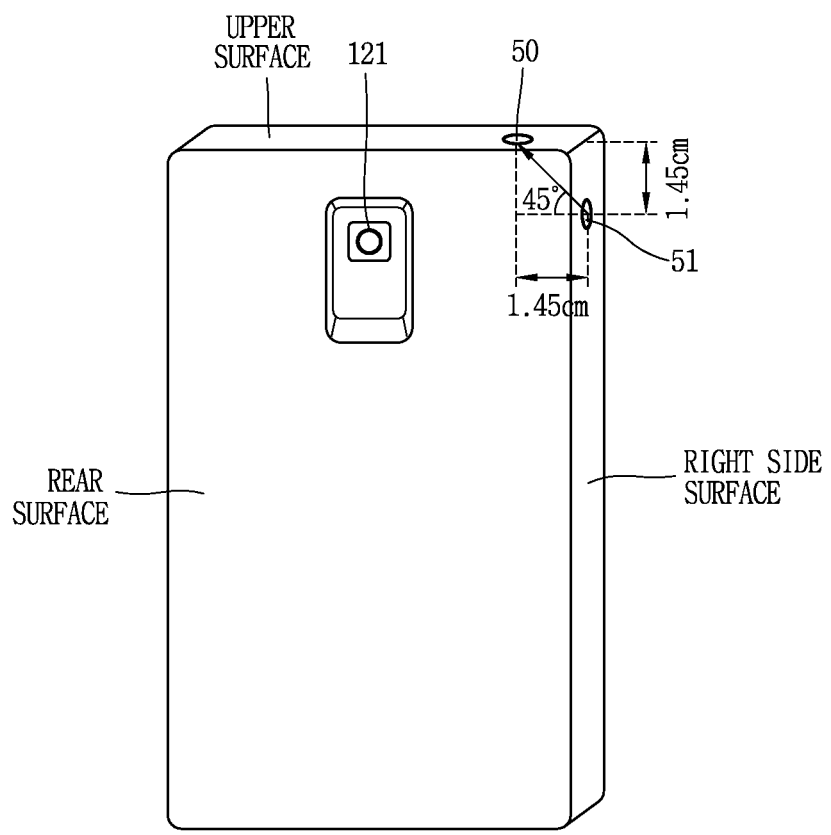
FIG. 17 is a view illustrating a modification embodiment of a microphone mounting structure of a mobile terminal according to a fifth embodiment of the present invention.

FIG. 17 is a view illustrating a modification embodiment of a microphone mounting structure of a mobile terminal according to a fifth embodiment of the present invention.

FIG. 17 illustrates the same microphone mounting structure as that of FIG. 16 in position and angle of the first microphone 50 and the second microphone 51. Referring to FIG. 17, the first microphone 50 and the second microphone 51 are arranged on the right of the rear camera 121.

In the present invention, the number of the microphones are two. However, the present invention is not limited to this. That is, the first to fifth embodiments may be executed in an independent manner, or in a combined manner. More specifically, three or more microphones are arranged under the aforementioned structure. Then, a specific microphone structure is automatically selected according to various types of capturing modes (e.g., figure mode, landscape mode, street mode and so on) or sound capturing modes (e.g., screen zoom interwork mode, gun mode, sound zoom change mode, gun position change mode, stereo mode and hearing aid mode). Under such adaptive arrangement structure, a user can capture a sound generated from a subject which is in a specific direction, in a more precise manner.

The present invention provides a microphone mounting structure and a using method thereof, in which microphones are mounted on various positions at various intervals therebetween, by interworking with a change of various situations such as a type of an execution application, a setting of a specific application (e.g., a sample rate, an image capturing mode by a camera, and a sound capturing mode) and a user's behavior type. Then, the number of microphones used to capture a sound, and a microphone combination are selected. Under such configuration, an optimum sound capturing function can be executed.

The plurality of microphones are arranged on front/rear surfaces, upper/lower surfaces, and right/left side surfaces of the mobile terminal in various manners, thereby forming directivity toward a specific direction. In this case, the front/rear microphones form front/rear directivities, the upper/lower microphones form upper/lower directivities, and the right/left side microphones form right/left directivities. Under such configuration, the plurality of microphones are properly operated to select directivity toward a specific direction. This can enhance a sound capturing performance.

Microphone Arrangement According to Sound Capturing Mode

Figure 18:
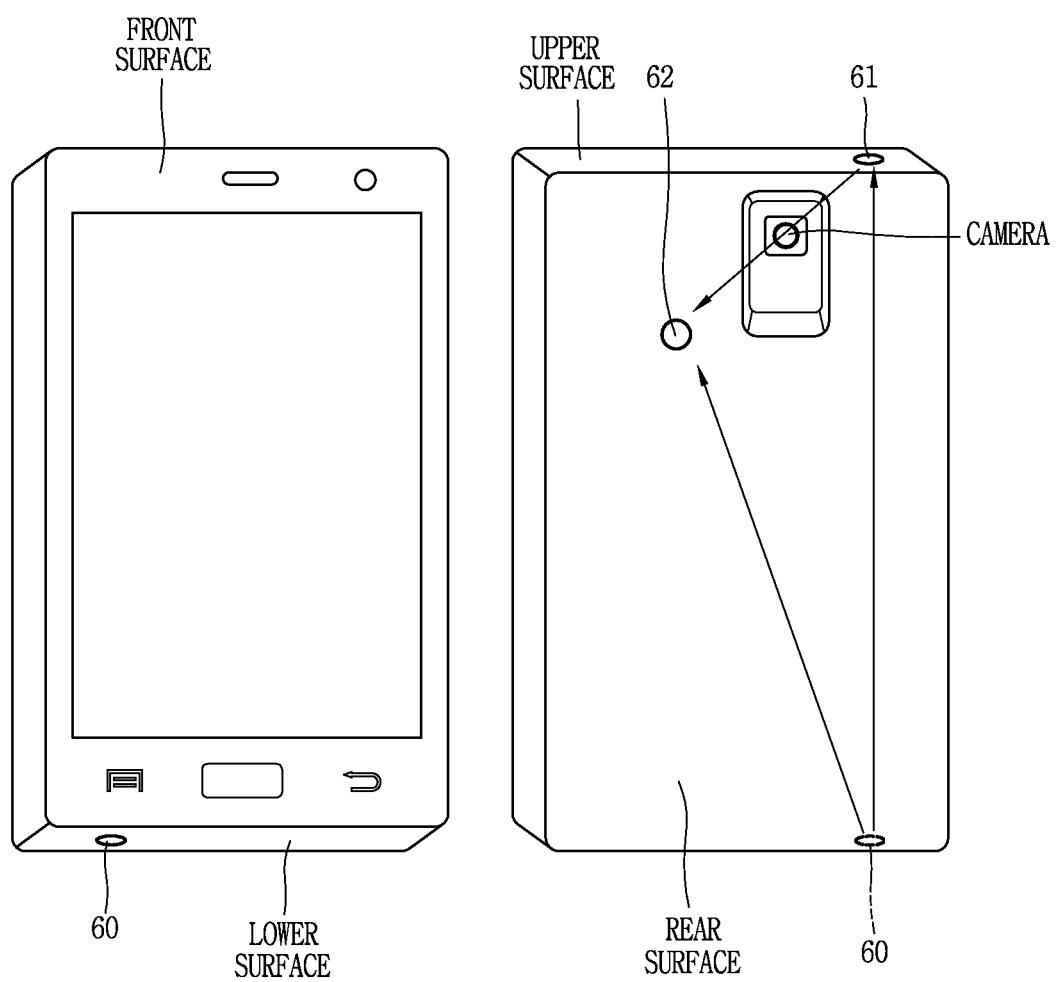
FIG. 18 is a view illustrating a microphone mounting structure of a mobile terminal according to a sixth embodiment of the present invention.

FIG. 18 is a view illustrating a microphone mounting structure of a mobile terminal according to a sixth embodiment of the present invention, where microphones are arranged according to a sound capturing mode. In the sixth embodiment, three or more microphones are arranged.

As aforementioned, a user may arbitrarily change a sound capturing mode, such as a screen zoom interwork mode, a gun mode and a gun position change mode, when capturing moving images. That is, the user may automatically change a sound capturing position and a range, by interworking with a change of a zoom angle (view angle) of an image captured in a screen zoom interwork mode or a gun mode. Further, the user captures a sound by setting a subject which exists on a screen in a gun position change mode, and by forming directivity.

In such sound capturing mode, a sound, which is generated from a subject in directions of the front side and the right/left sides, is captured. Further, in order to obtain an optimum sound capturing function in the sound capturing mode, it is very important to match a position of a subject on a screen with a position of a substantial sound generated from the subject. In order to obtain an optimum sound capturing function during audio zooming, microphones should be arranged with consideration of directivity with respect to a sound and a position of a camera.

As shown in FIG. 18, under the microphone arrangement structure according to a sound capturing mode, microphones 60 and 62 are arranged on the upper surface and the lower surface of the terminal body, and a microphone 61 is arranged at one side of the rear surface of the terminal body. A position of a camera is determined based on the number of microphones to be arranged.

Figure 19A:
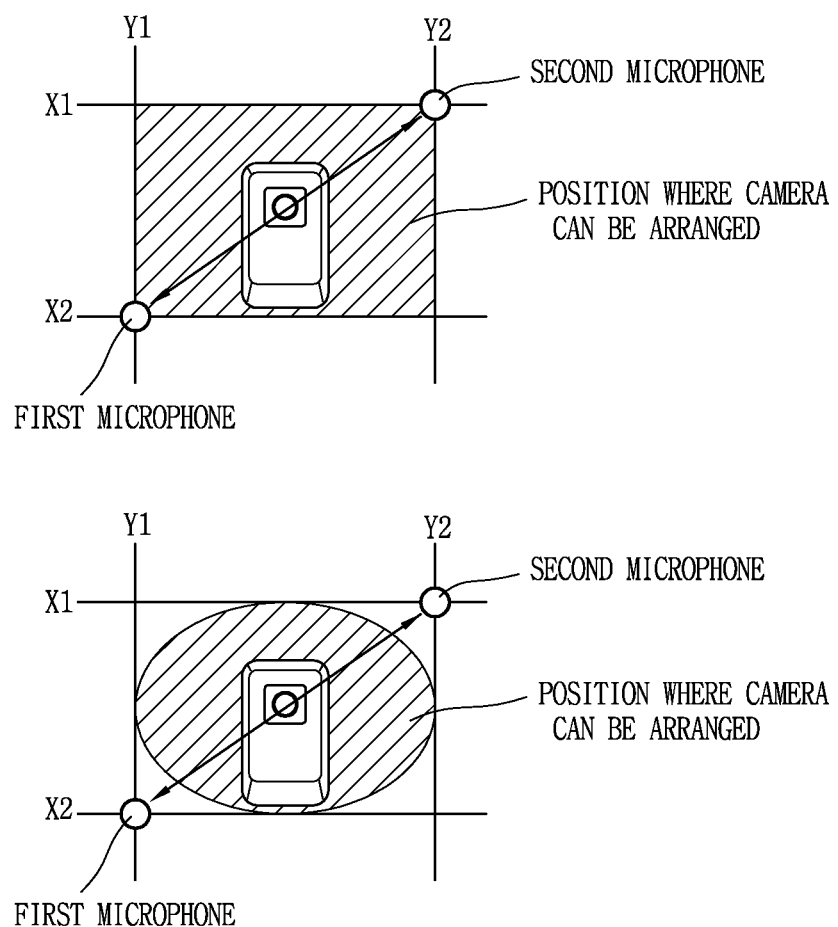
FIGS. 19A and 19B are views illustrating an optimum position of a camera in case of mounting two or three microphones.
Figure 19B:
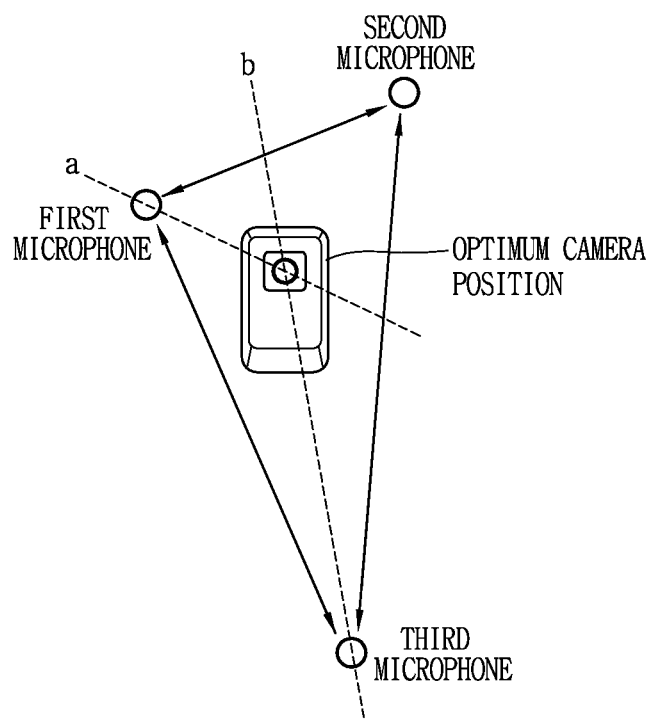

FIGS. 19A and 19B are views illustrating an optimum position of a camera in case of mounting two or three microphones.

As shown in FIG. 19A, in case of mounting two microphones, a camera may be arranged within a region (quadrangle or circle) formed by lines which pass through a first microphone and a second microphone in directions of an X-axis and a Y-axis. Here, an optimum position of a camera is the center of a straight line which connects the first microphone with the second microphone. Such microphone mounting structure may be applied to the first and second embodiments of the present invention.

As shown in FIG. 19B, in case of using three microphones for audio zooming, an optimum position of a camera is the center on a plane which connects a first microphone, a second microphone and a third microphone with one another. In case of using four or more microphones, an optimum position of a camera is determined in the same manner.

Microphone Arrangement According to Execution Application and Using Method Thereof Generally, a sampling rate (SR) of a sound indicates a rate to extract a specimen from a sound waveform for digitalization of an analogue sound. When the SR is greater, a value close to the original analogue sound can be obtained because the number of specimens to be extracted increases.

In the mobile terminal, various sampling rates (SR) of a sound are used according to a type of an execution application. For instance, in a general call mode (video call mode), a speaker mode, a voice recording mode, and a voice recognition mode, sampling rates of 8 and 16 KHz are used. In case of capturing moving images, various types of sampling rates of 8, 16, 22.05, 44, 48 KHz, etc. are used according to a type of an execution application. 8 and 16 KHz are used to capture a low sound quality, 22.5 KHz is used to capture a middle sound quality, and 44 and 48 KHz are used to capture a high sound quality.

An optimum microphone interval for implementing an optimum audio zooming function is determined according to a sampling rate. That is, if a sampling rate is high, a microphone interval should be narrow for an excellent sound capturing function. On the other hand, if a sampling rate is low, a microphone interval should be wide for an excellent sound capturing function.

In the present invention, a plurality of microphones are arranged at various intervals so that two or three microphones can be combined with each other in an optimum manner according to various sampling rate (SR) values. Then, the microphone combination is selected according to a type of an application, i.e., an SR value.

Figure 20A:
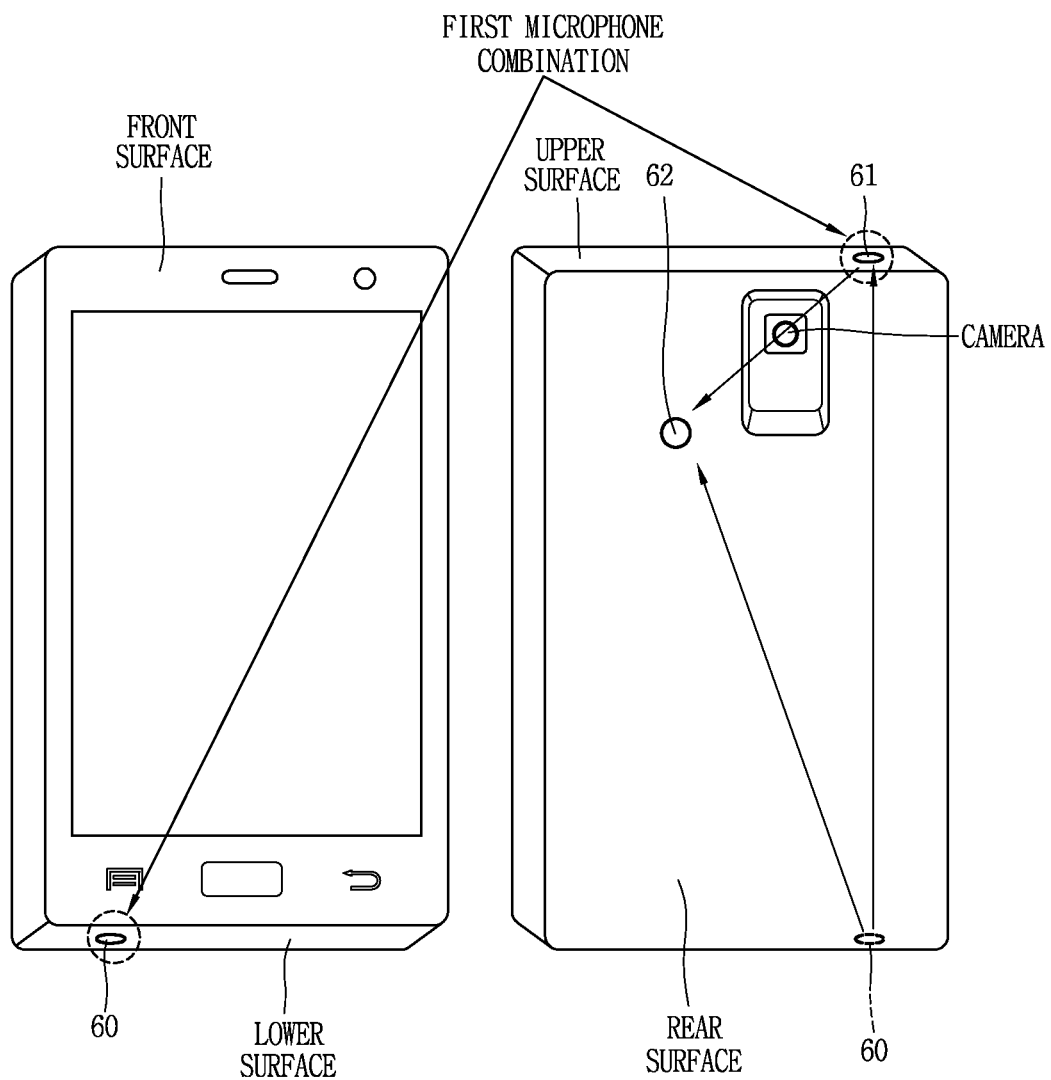
FIGS. 20A to 20C are views illustrating a microphone mounting structure of a mobile terminal according to a seventh embodiment of the present invention.
Figure 20B:
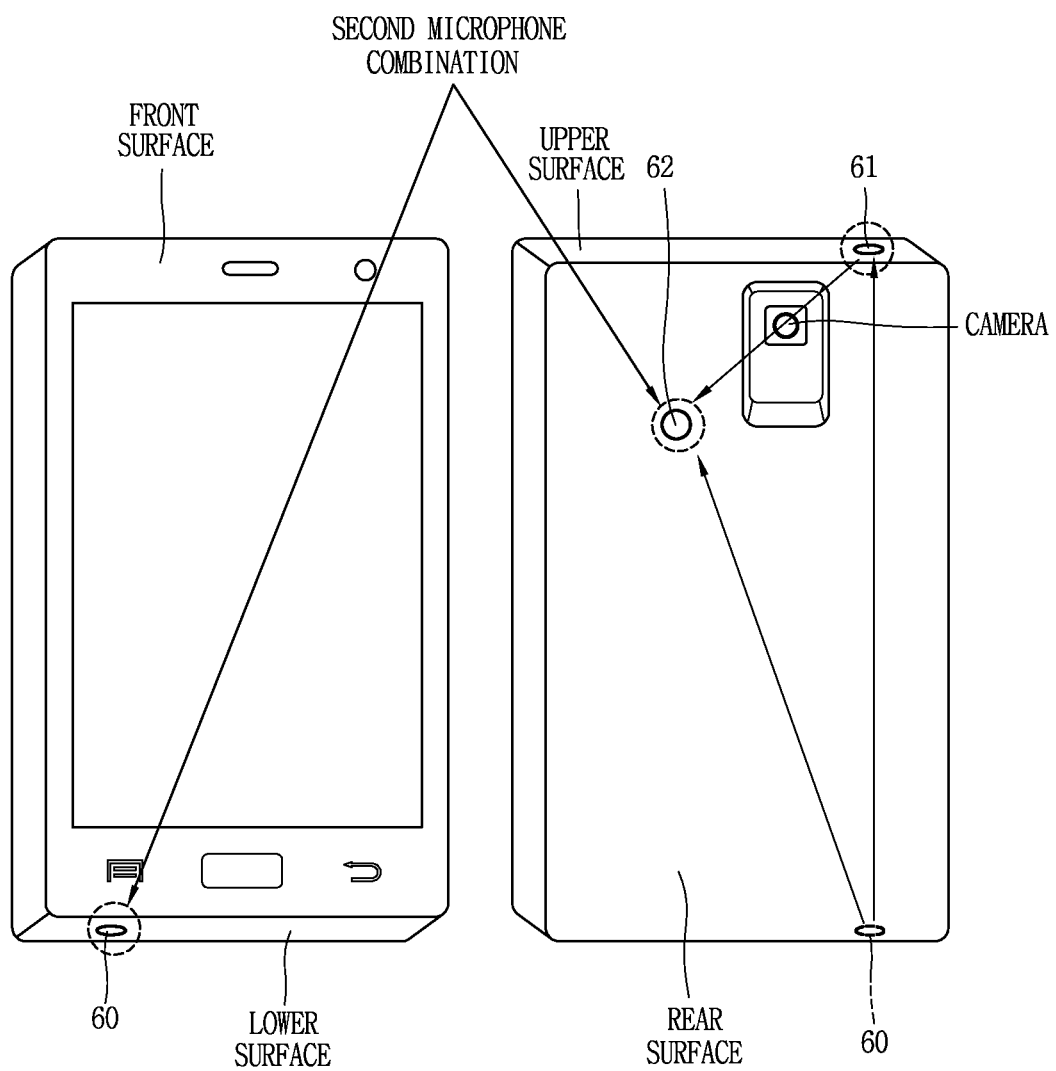
Figure 20C:
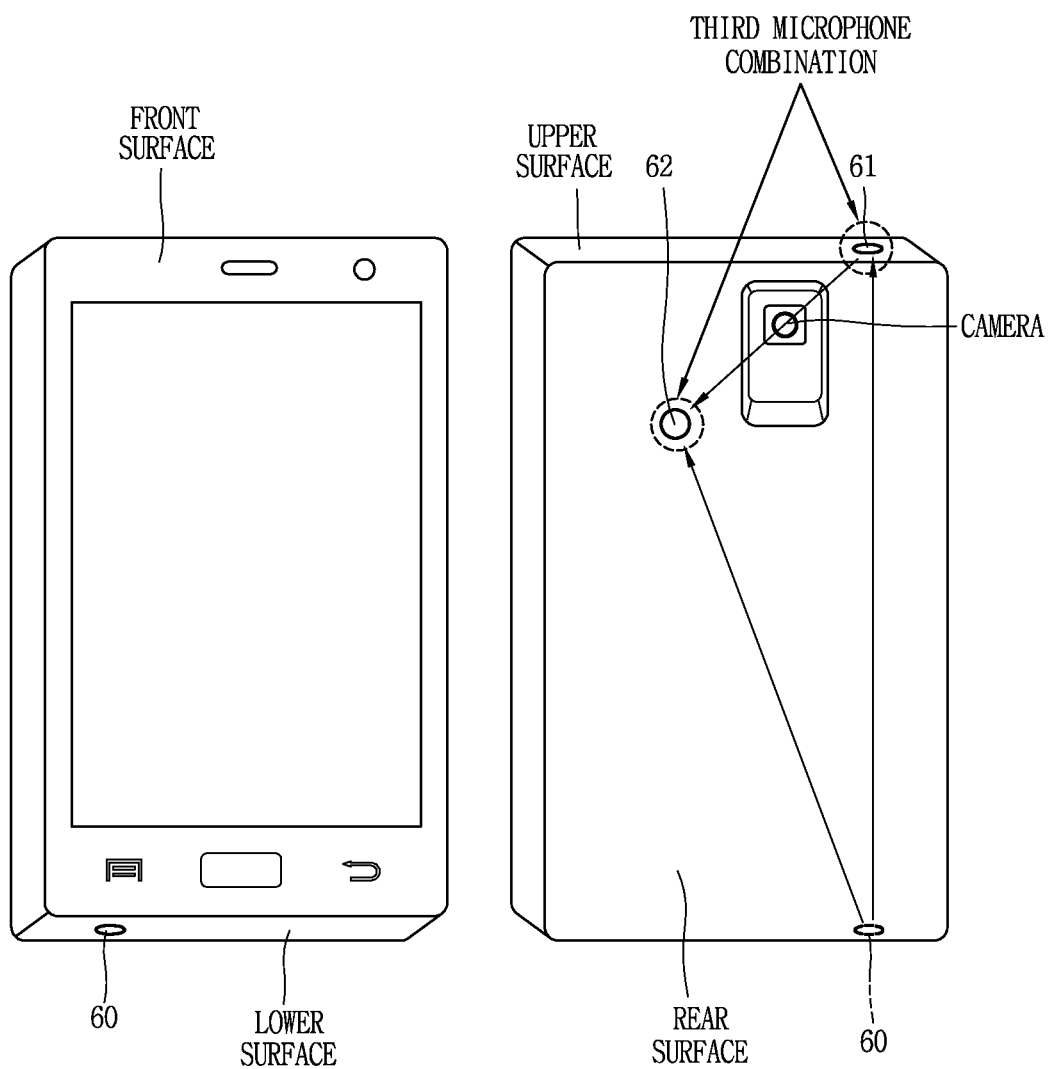

FIGS. 20A to 20C are views illustrating a microphone mounting structure of a mobile terminal according to a seventh embodiment of the present invention, in which microphones are arranged according to an execution application.

Referring to FIGS. 20A to 20C, three microphones 60, 61 and 62 are arranged for a prescribed combination according to an SR value.

For instance, the microphones 60 and 61 are spaced from each other with a first distance, so as to be used when an application of a low sampling rate (SR) (8 and 16 KHz) is executed. The microphones 60 and 62 are spaced from each other with a second distance, so as to be used when an application of a middle sampling rate (SR) (22.5 KHz) is executed. The microphones 61 and 62 are spaced from each other with a third distance, so as to be used when an application of a high sampling rate (SR) (44 and 48 KHz) is executed. The first distance is the largest, and the third distance is the smallest.

Under such arrangement structure, the controller 180 detects a type of an application executed by a user, and then enables a microphone combination corresponding to the detected application type, i.e., a sampling rate (SR).

More specifically, as shown in FIG. 20A, in a general call mode (video mode), a voice recording mode, a voice recognition mode, and a capturing mode with a low sound quality, a first microphone combination (60, 61) is selected and then a sound is captured for audio zooming. As shown in FIG. 20B, in case of capturing a subject with a middle sound quality, a second microphone combination (60, 62) is selected and then a sound is captured for audio zooming. As shown in FIG. 20C, in case of capturing a subject with a high sound quality, a third microphone combination (61, 62) is selected and then a sound is captured for audio zooming.

In case of a mobile terminal where three or more microphones are arranged, microphone intervals and microphone combinations can be implemented in a more various manner. Such method is the same as that shown in FIGS. 20A to 20C, and thus its detailed explanations will be omitted.

Figure 21:
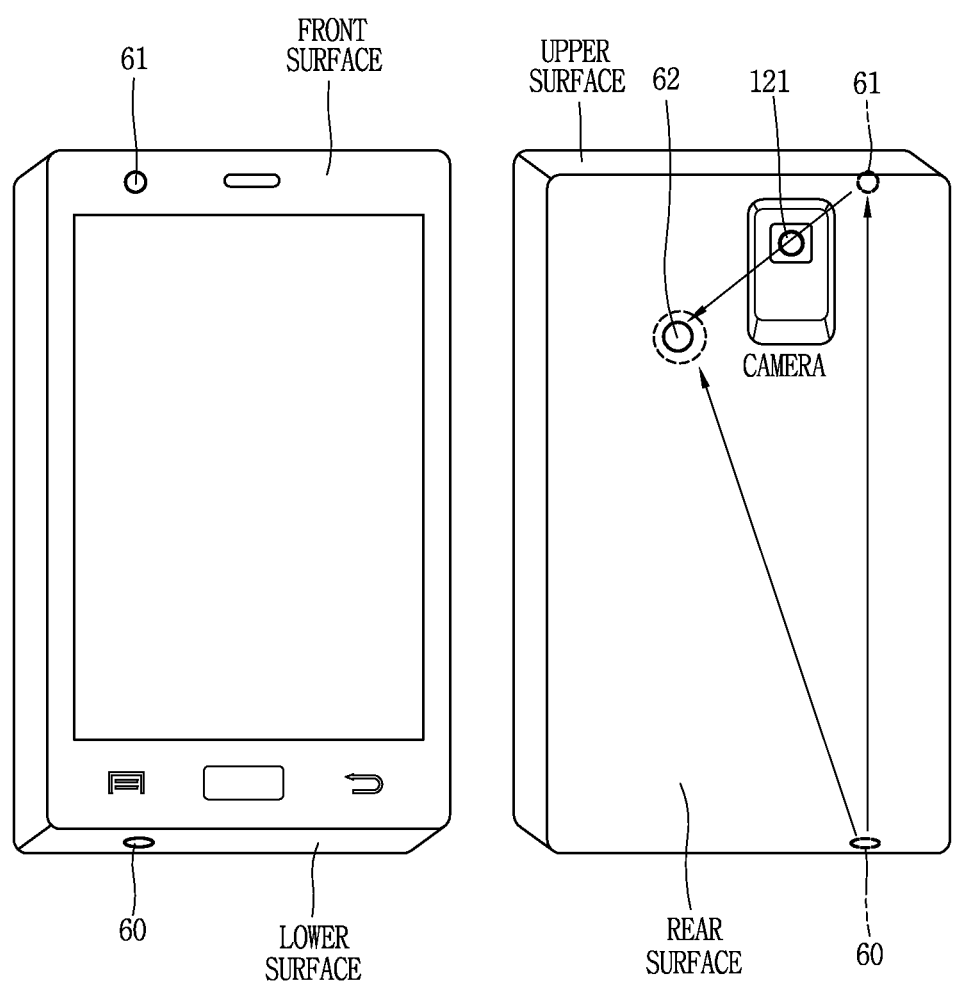
FIG. 21 is a view illustrating a microphone mounting structure of a mobile terminal according to an eighth embodiment of the present invention.

Microphone Arrangement Through Selection of Front/Rear Cameras and Using Method Thereof FIG. 21 is a view illustrating a microphone mounting structure of a mobile terminal according to an eighth embodiment of the present invention, in which microphones are arranged with consideration of selection of cameras.

Generally, a front camera of a mobile terminal is used to perform a video call or a self camera capturing, whereas a rear camera thereof is used to perform a general capturing. Accordingly, in case of using the front camera, the mobile terminal should capture only a sound generated from the front side by forming directivity toward the front side. On the other hand, in case of using the rear camera, the mobile terminal should capture only a sound generated from the rear side by forming directivity toward the rear side.

As shown in FIG. 21, the microphones 61 and 62 are arranged on the front surface and the rear surface of the mobile terminal. The controller 180 detects a phase difference between signals generated from the front/rear sides, by an interval between the microphones 61 and 62 corresponding to a thickness of the mobile terminal. Based on the detected phase difference, the controller 180 determines whether the current position where a signal has occurred is the front side or the rear side. More specifically, a sound generated from the front side firstly reaches the front microphone

61 than the rear microphone 62, and a sound generated form the rear side firstly reaches the rear microphone 62 than the front microphone 61. Accordingly, a direction of a sound source can be detected based on a time difference in receiving sounds.

In the present invention, the front microphone 61 or the rear microphone 62 is selectively operated according to a capturing mode selected by a user (e.g., self camera mode or general capturing mode). For instance, if a self camera mode is selected, the controller 180 captures sounds from sound sources using the front microphone 61, and records only sounds captured from the front side using an audio zooming technique. On the other hand, if a general capturing mode is selected, the controller 180 captures sounds from sound sources using the rear microphone 62, and records only sounds captured from the rear side using an audio zooming technique.

Microphone Arrangement Considering User's Behavior and Using Thereof

In case of a mobile terminal where a plurality of microphones are mounted, the microphones should be arranged so as to operate even by a user's various behaviors. For instance, under the microphone mounting structure of FIG. 21, if a user makes the mobile terminal be in a horizontal view state when performing a voice call in a speaker phone mode, the rear microphone 62 is blocked not to capture a sound. As a result, audio zooming cannot be performed.

In the case where the rear microphone 62 mounted on the rear surface of the mobile terminal is blocked, a sound should be captured using other microphones. Accordingly, the microphones 60 and 62 should be arranged at an upper end and a lower end as shown in FIG. 21.

In a case where a user performs a video call with holding the mobile terminal, a sound captured by the microphone 60 may be distorted by the user's hand, or may not be captured (a microphone signal may not be introduced). In this case, the microphones 61 and 62 should be arranged at positions spaced from the user's holding position, for audio zooming using the microphones 61 and 62.

The present invention provides a method capable of implementing an audio zooming function, by automatically changing a setting or an operation (enable/disable) of microphones by monitoring a state of the mobile terminal (rotation angle, whether signals from the microphones have been introduced into the mobile terminal) according to a user's behavior scenario, and by informing a user the changed setting or operation.

For instance, if the microphone 60 is blocked by a user's hand or if signals from the microphones are not introduced into the mobile terminal as the microphone 62 is blocked, the mobile terminal captures a sound by automatically changing the current microphone to another microphone. If the mobile terminal rotates while capturing a stereo moving image, set channels of the microphones 61 and 62 are automatically compensated according to a rotation angle.

The mobile terminal may have the following operation mode according to a user's behavior.

Handset mode: A call state where the mobile terminal contacts a user's ear
Hand-held mode: A call state through a speaker, where the mobile terminal is held by the hand (non-horizontal state)
Desktop mode: A state where the mobile terminal is positioned on a horizontal surface (horizontal state)

The handset mode is sensed by a proximity sensor provided at the mobile terminal, and the hand-held mode and the desktop mode are sensed by a gyro sensor.

Once the handset mode is sensed by the proximity sensor, the controller 180 turns off a screen. At the same time, the controller 180 enables the microphone 60 arranged on the lower surface of the terminal body, but disables the microphones 61 and 62 arranged on the rear surface of the terminal body. Upon detection of the hand-held mode where a user performs a call through a speaker, the controller 180 disables the microphone 62 arranged on the rear surface of the terminal body, but enables the microphones 61 and 61.

If a sensor such as a gyro sensor senses a horizontal state of the mobile terminal, or if there is no pressure input from the microphone 62 arranged on the rear surface of the terminal body, the controller 180 determines the current mode as a desktop mode. At the same time, the controller 180 disables the microphone 62 arranged on the rear surface of the terminal body, but enables the microphones 60 and 61.

Figure 22:
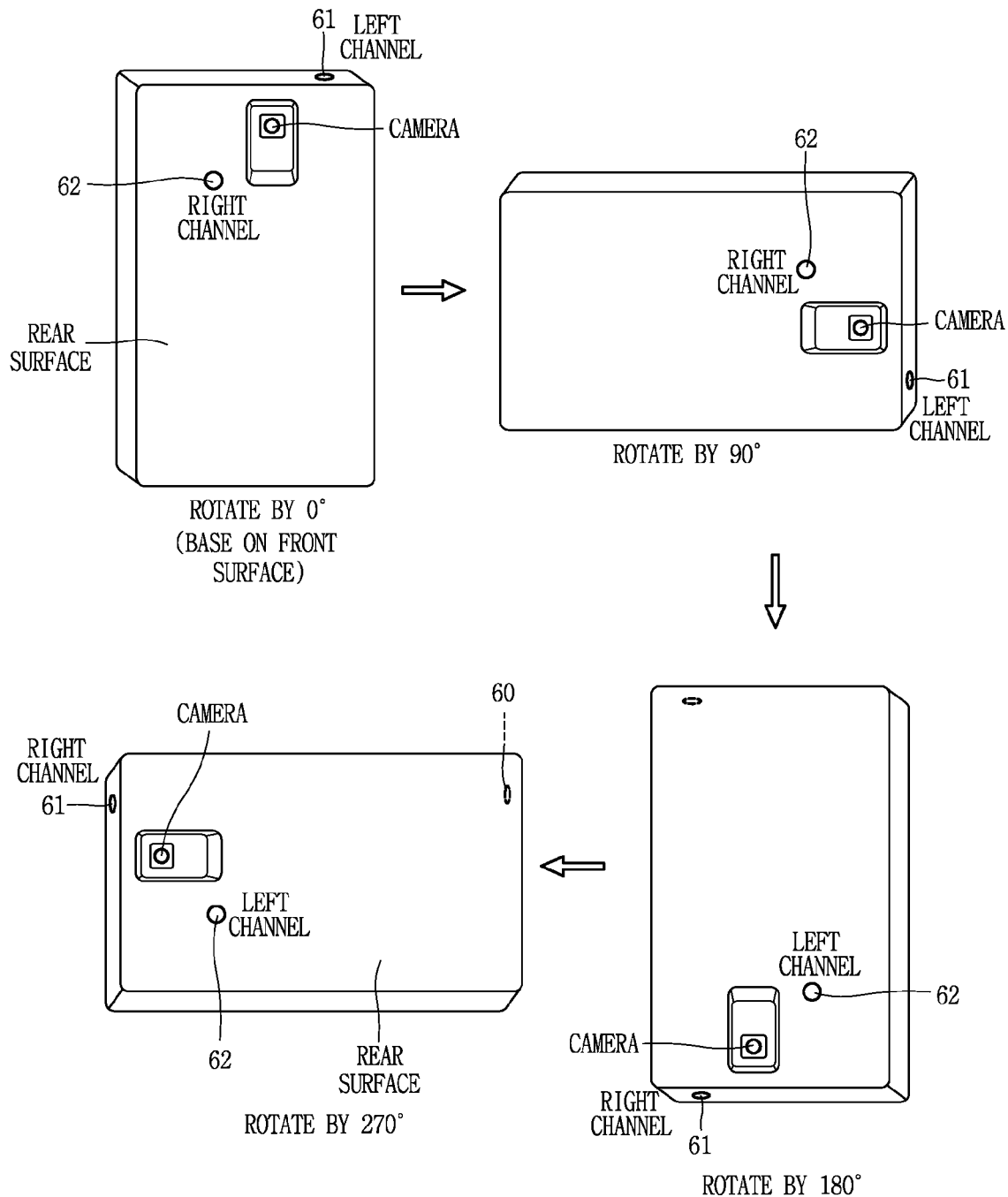
FIG. 22 is a view illustrating an example to compensate for channels of microphones according to a rotation direction of a mobile terminal where two or three microphones have been arranged.

FIG. 22 is a view illustrating an example to compensate for channels of microphones according to a rotation direction of a mobile terminal where two or three microphones have been arranged.

As shown in FIG. 22, when a user captures stereo moving images while rotating the mobile terminal by various angles, the controller 180 compensates for a setting of a left channel and a right channel with respect to the respective microphones 61 and 62 according to the rotation angles (90°, 180° and 270°). Under such configuration, a sound from a sound source can be precisely captured, and thus optimum audio zooming can be performed.

As shown in FIGS. 18 to 22, microphones are arranged on front/rear surfaces and upper/lower surfaces of the terminal body with a spacing distance therebetween. Then, a camera is arranged at an optimum position with respect to the arranged microphones. Then, optimum microphones (or microphone combination) are selected according to a sound capturing mode, an application, selection of a front camera or a rear camera, and a user's behavior scenario. Under such configuration, an optimum audio zooming function can be performed.

In the preferred embodiments shown in FIGS. 18 to 22, a plurality of microphones are arranged, and the positions of the microphones are changed according to a user's behavior scenario.

However, in the preferred embodiments, there is a restriction that a plurality of microphones should be arranged. In order to solve such restriction, a single microphone may be provided, and then a plurality of holes are arranged on each surface of the terminal body, thereby enhancing an operability of the microphone.

The present invention can have the following advantages.

Firstly, in case of mounting two microphones in the mobile terminal, one microphone is arranged on one axis, and another microphone is arranged on another axis with a spacing distance from said one microphone at a prescribed angle. Under such configuration, even if the mobile terminal performs a capturing operation or a playback operation in a horizontal view state or in a vertical view state, directivity with respect to sound sources distributed on the horizontal axis and the vertical axis based on a user, can be precisely maintained. As a result, the conventional problem, a limited performance of the mobile terminal according to a rotation angle of the mobile terminal, can be solved. Especially, in case of applying an audio zooming technique, a desired sound can be captured in a more precise manner.

Further, at least three microphones are arranged on the front/rear surfaces and the upper/lower surfaces of the terminal body with a spacing distance therebetween. Then, a camera is arranged at an optimum position with respect to the arranged microphones. Then, optimum microphones (or microphone combination) are selected according to a sound capturing mode, an application, selection of a front camera or a rear camera, and a user's behavior scenario. Under such configuration, an optimum audio zooming function can be performed.

The aforementioned method may be implemented as a program code stored in a computer-readable storage medium. The storage medium may include ROM, RAM, CD-ROM, a magnetic tape, a floppy disc, an optical data storage device, etc. The storage medium may be implemented as carrier wave (transmission through the Internet), and the computer may comprise the controller of the mobile terminal.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A microphone mounting structure of a mobile terminal, comprising:
   a first microphone mounted to one side surface of a body, the side surface having a vertical axis extending between a top edge and a bottom edge and a horizontal axis extending between a first side edge and a second side edge; and
   a second microphone spaced from the first microphone by a prescribed by a first distance determined by a sampling rate, and
   wherein the first microphone and the second microphone are spaced from one another in the horizontal direction by a second distance, and
   wherein the first microphone and the second microphone are spaced from one another in the vertical direction by a third distance, the third distance being equal to the second distance.

2. The microphone mounting structure of claim 1, wherein the second distance is 1.45 cm based on a sampling rate of 22.05 KHz.

3. The microphone mounting structure of claim 1, wherein the first microphone and the second microphone are arranged at a right side or a left side of a camera.

4. The microphone mounting structure of claim 1, wherein if the first microphone is positioned on the horizontal axis, the second microphone is positioned on the vertical axis, at an upper or lower right side based on the first microphone, at an angle of 45°.

5. The microphone mounting structure of claim 1, wherein if the first microphone is positioned on the vertical axis based on a user, the second microphone is positioned on the horizontal axis, at an upper or lower left side based on the first microphone, at an angle of 45°.

6. The microphone mounting structure of claim 1, wherein the first microphone and the second microphone are arranged on different surfaces of the body.

7. The microphone mounting structure of claim 6, wherein the first microphone is arranged on a rear surface of the body, and the second microphone is arranged on an upper surface or a front surface of the body.

8. The microphone mounting structure of claim 6, wherein the first microphone is arranged on an upper surface of the body, and the second microphone is arranged on a rear surface or a right side surface of the body.

9. The microphone mounting structure of claim 6, wherein the first microphone is arranged on a front surface of the body, and the second microphone is arranged on a rear surface of the body.

10. The microphone mounting structure of claim 6, wherein the first microphone is arranged on a rear surface of the body, and the second microphone is arranged on a right side surface of the body.

11. The microphone mounting structure of claim 6, wherein the first microphone is arranged on a left side surface of the body, and the second microphone is arranged on a rear surface or an upper surface of the body.

12. The microphone mounting structure of claim 1, wherein a camera is arranged within a region formed by lines which pass through the first microphone and the second microphone in directions of the horizontal axis and the vertical axis.

13. The microphone mounting structure of claim 12, wherein an optimum position of the camera is the center of a straight line which connects the first microphone and the second microphone with each other.

* * * * *